US009226328B2

(12) United States Patent
Ren

(10) Patent No.: US 9,226,328 B2
(45) Date of Patent: *Dec. 29, 2015

(54) COMMUNICATION APPARATUS

(71) Applicant: Brother Kogyo Kabushiki Kaisha, Nagoya-shi, Aichi-ken (JP)

(72) Inventor: Yongyong Ren, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 77 days.

This patent is subject to a terminal disclaimer.

(21) Appl. No.: 14/039,212

(22) Filed: Sep. 27, 2013

(65) Prior Publication Data
US 2014/0094211 A1 Apr. 3, 2014

(30) Foreign Application Priority Data

Sep. 28, 2012 (JP) .................................. 2012-218271

(51) Int. Cl.
H04W 76/02 (2009.01)
H04W 60/00 (2009.01)
H04W 84/20 (2009.01)

(52) U.S. Cl.
CPC ............ *H04W 76/021* (2013.01); *H04W 60/00* (2013.01); *H04W 84/20* (2013.01)

(58) Field of Classification Search
None
See application file for complete search history.

(56) References Cited

U.S. PATENT DOCUMENTS

| 6,005,869 | A  | * | 12/1999 | Sakai et al. ................... 370/452 |
| 6,026,303 | A  |   | 2/2000 | Minamisawa |
| 8,817,594 | B2 | * | 8/2014 | Gero et al. ..................... 370/217 |
| 8,819,247 | B2 |   | 8/2014 | Hymel |
| 8,886,195 | B2 |   | 11/2014 | Srinivasan et al. |
| 8,908,537 | B2 | * | 12/2014 | Fedyk et al. ................... 370/244 |
| 8,908,550 | B2 | * | 12/2014 | Kwon et al. ................... 370/252 |
| 2005/0165795 | A1 |   | 7/2005 | Myka et al. |
| 2007/0242665 | A1 |   | 10/2007 | Habetha et al. |

(Continued)

FOREIGN PATENT DOCUMENTS

EP 1550968 A1 7/2005
EP 2503840 A1 9/2012

(Continued)

OTHER PUBLICATIONS

Wi-Fi Alliance Technical Committee P2P Task Group, Wi-Fi Peer-to-Peer (P2P) Technical Specifications; Version 1.1: 2010.

(Continued)

*Primary Examiner* — Bobbak Safaipour
(74) *Attorney, Agent, or Firm* — Banner & Witcoff, Ltd.

(57) ABSTRACT

A communication apparatus includes: a processor; and memory storing instructions that, when executed by the processor, causes the processor to execute: receiving identification information of a first device of the slave station devices from the first device through the master station device; transmitting, in a specific case where the master station device is disconnected from the first wireless network, a first type command to the first device by using the identification information of the first device, wherein the first type command is a command for establishing a state where a transmission source device and a transmission destination device thereof belong to a same wireless network; and establishing, when the first type command is transmitted to the first device, a first state where the communication apparatus and the first device belong to a second wireless network different from the first wireless network.

9 Claims, 12 Drawing Sheets

(56) References Cited

U.S. PATENT DOCUMENTS

| | | |
|---|---|---|
| 2009/0276531 A1 | 11/2009 | Myka et al. |
| 2012/0127855 A1 | 5/2012 | Alon et al. |
| 2012/0244902 A1 | 9/2012 | Saito et al. |
| 2014/0094209 A1* | 4/2014 | Ren .............................. 455/515 |

FOREIGN PATENT DOCUMENTS

| | | |
|---|---|---|
| JP | H10-145276 A | 5/1998 |
| JP | 2007-512753 A | 5/2007 |
| WO | 2004107655 A1 | 12/2004 |
| WO | 2011003457 A1 | 1/2011 |

OTHER PUBLICATIONS

Co-Pending U.S. Appl. No. 14/039,241, filed Sep. 27, 2013.

Extended EP Searh Report mailed Mar. 20, 2014, EP Appln. 13186522.2.

Oct. 15, 2015—(US) Notice of Allowance—U.S. Appl. No. 14/039,241.

* cited by examiner (THIRD ILLUSTRATIVE EMBODIMENT; CASE F)

(FOURTH ILLUSTRATIVE EMBODIMENT; CASE G)

(FOURTH ILLUSTRATIVE EMBODIMENT; CASE H)

COMMUNICATION APPARATUS

CROSS-REFERENCE TO RELATED APPLICATION

This application claims priority from Japanese Patent Application No. 2012-218271 filed on Sep. 28, 2012, the entire subject matter of which is incorporated herein by reference.

TECHNICAL FIELD

This disclosure discloses a communication apparatus that belongs to a wireless network.

BACKGROUND

There is a system having a first station, a second station and an access point. The first station transmits an invitation message to the second station through the access point. When the second station receives the invitation message, the second station transmits a response message to the first station through the access point. Thereby, the first station and the second station directly perform communication, without through the access point.

SUMMARY

This disclosure discloses a technology for establishing a state where two or more devices of a plurality of slave station devices belong to a new wireless network when a master station device is disconnected from a wireless network to which the master station device and the plurality of slave station devices belong.

A communication apparatus of this disclosure includes: a processor; and memory storing instructions that, when executed by the processor, causes the processor to execute: receiving identification information of a first device from the first device through a master station device, at a state where a first wireless network has been established to which a master station device and a plurality of slave station devices belong, wherein the first device is one of the plurality of slave station devices; registering the identification information of the first device with the memory of the communication apparatus; transmitting a first type command to the first device by using the identification information of the first device registered in the memory, in a specific case where the master station device is disconnected from the first wireless network, wherein the first type command is a command for establishing a state where a transmission source device, from which the first type command is transmitted, and a transmission destination device, to which the first type command is transmitted, belong to a same wireless network; and establishing a first state, when the first type command is transmitted to the first device, wherein the first state is a state where the communication apparatus and the first device belong to a second wireless network different from the first wireless network.

According to the above configuration, at the state where the first wireless network has been established, the communication apparatus receives the identification information of the first device and registers the same with the memory. Therefore, in case of the specific case where the master station device is disconnected from the first wireless network, the communication apparatus can transmit the first type command to the first device by using the identification information of the first device in the memory. As a result, it is possible to appropriately establish the first state where the communication apparatus and the first device belong to the second wireless network.

A control method, a computer program and a computer-readable recording medium storing the computer program for implementing the communication apparatus are also novel and useful. Also, a system including the communication apparatus and the first device is also novel and useful.

BRIEF DESCRIPTION OF THE DRAWINGS

The foregoing and additional features and characteristics of this disclosure will become more apparent from the following detailed descriptions considered with the reference to the accompanying drawings, wherein.

FIRST ILLUSTRATIVE EMBODIMENT (Configuration of Communication System 2)

Figure 1:
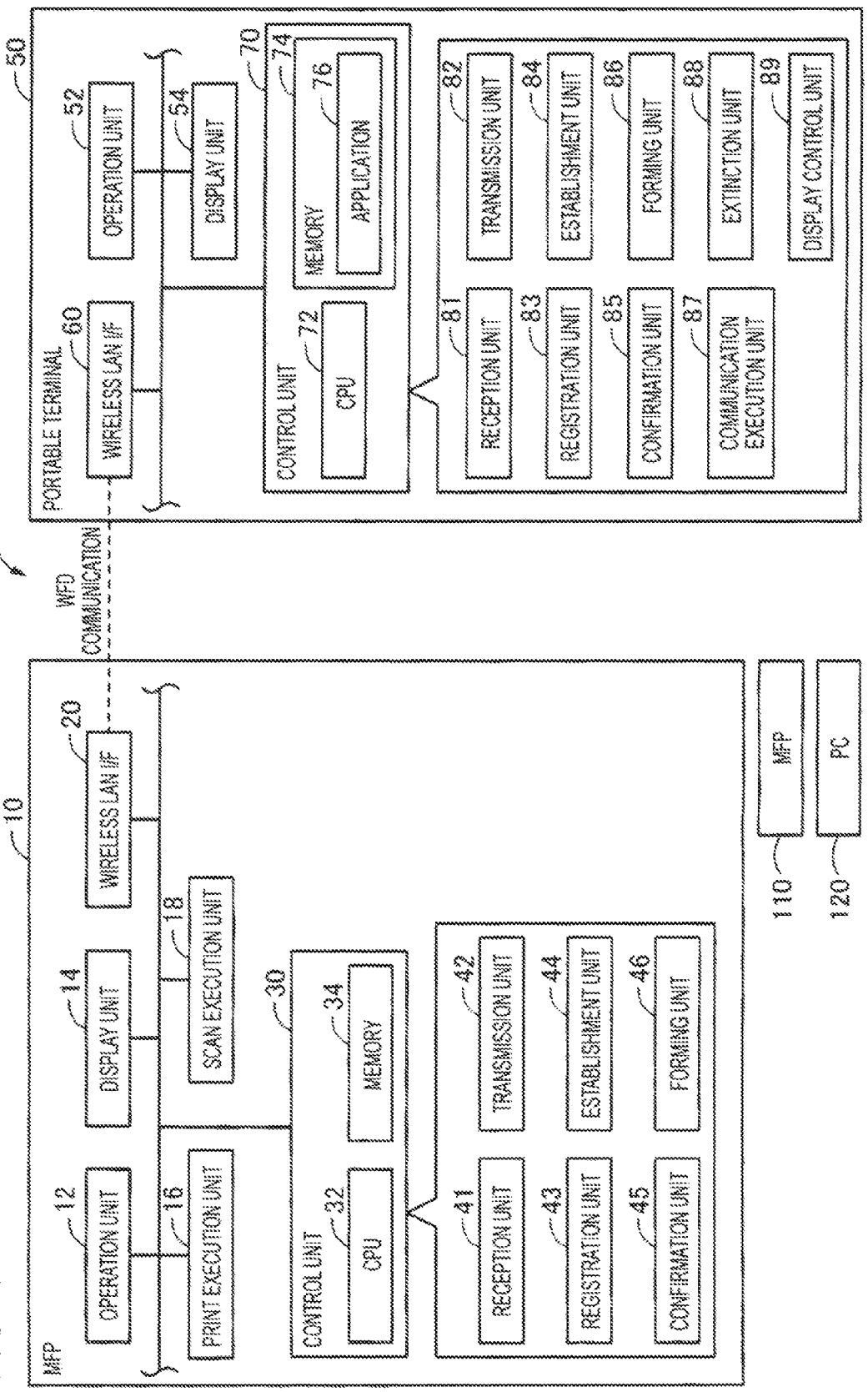
FIG. 1 illustrates a configuration of a communication system.

As shown in FIG. 1, a communication system 2 includes a plurality of MFPs (Multi-Function Peripherals) 10, 110, a portable terminal 50 and a personal computer (hereinafter, referred to as 'PC') 120.

(Types of Wireless Communication that can be Performed by Respective Devices 10, 50, 110, 120)

The respective devices 10, 50, 110, 120 can perform wireless communication based on a WFD (Wi-Fi Direct) mode and wireless communication based on a normal Wi-Fi mode. In the below, the wireless communications based on the respective methods are referred to as 'WFD communication' and 'normal W-Fi communication', respectively.

(WFD Communication)

The WFD mode is a wireless communication method that is set in the written standard 'Wi-Fi Peer-to-Peer (P2P) Technical Specification Version 1.1' prepared by the Wi-Fi Alliance. The WFD mode is a wireless communication method for performing wireless communication, based on IEEE (The Institute of Electrical and Electronics Engineers, Inc.) 802.11 standards and standards (for example, 802.11a, 11b, 11g, 11n and the like) acting on the 802.11 standards.

The respective devices 10, 50, 110, 120 belong to a WFD network (hereinafter, referred to as 'WFDNW'), thereby performing WFD communication of target data with another device belonging to the WFDNW. The target data is data including information of a network layer of an OSI reference model and information of an upper layer (for example, an application layer) of the network layer, and includes print data, scan data and the like, for example.

A device that can perform WFD communication, such as respective devices 10, 50, 110, 120, is referred to as 'WFD compatible device'. In the written standards of the WFD, three states of a Group Owner state (hereinafter, referred to as 'G/O state'), a client state (hereinafter, referred to as 'CL state') and a device state are defined as the WFD compatible device state. The WFD compatible device can selectively operate at one of the three states.

When newly establishing a wireless network, first and second WFD compatible devices normally perform wireless communication referred to as G/O negotiation. In the G/O negotiation, the first WFD compatible device (for example, the MFP 10) transmits information, which indicates a G/O priority of the first WFD compatible device, to the second WFD compatible device (for example, the PC 120) and receives information, which indicates a G/O priority of the second WFD compatible device, from the second WFD compatible device. The G/O priority of the first WFD compatible device is an index indicating a degree that the first WFD compatible device should be at the G/O state and is predetermined for the first WFD compatible device. Likewise, the G/O priority of the second WFD compatible device is an index indicating a degree that the second WFD compatible device should be at the G/O state.

The first WFD compatible device compares two G/O priorities to thus determine that a device having a higher priority becomes at the G/O state and that a device having a lower priority becomes at the CL state. The second WFD compatible device compares two G/O priorities to thus determine the G/O state and the CL state.

For example, it is assumed that the first WFD compatible device is at the G/O state and the second WFD compatible device is at the CL state. In this case, the first WFD compatible device first prepares WFD wireless setting information that should be used in the WFDNW. The WFD wireless setting information includes an authentication method, an encryption method, a password, an SSID (Service Set Identifier), a BSSID (Basic Service Set Identifier) and the like. The authentication method, the encryption method and the password that are included in the WFD wireless setting information is information that is used for authentication and encryption in the WFDNW. The SSID that is included in the WFD wireless setting information is a network identifier for identifying a WFDNW. The BSSID that is included in the WFD wireless setting information is a MAC address of a G/O device (i.e., the first WFD compatible device). Meanwhile, in the below, the WFD wireless setting information is referred to as WDFWSI (WFD Wireless Setting Information).

The method in which the first WFD compatible device (i.e., a G/O device) prepares WFDWSI is as follows. That is, the first WFD compatible device specifies an authentication method and an encryption method, which have been predetermined. The first WFD compatible device specifics a predetermined password or newly generates a password, thereby preparing a password. The first WFD compatible device specifies a predetermined SSTD or newly generates an SSID, thereby preparing an SSTD. The first WFD compatible device specifies a MAC address, which is allocated to the first WFD compatible device, as a BSSID.

The first WFD compatible device supplies the prepared WFDWSI to the second WFD compatible device. Thereby, the first and second WFD compatible devices perform authentication communication (i.e., communication of an Authentication Request signal, a 4-Way Handshake signal and the like based on the WFDWSI. The first WFD compatible device (i.e., a G/O device) executes authentication of the second WFD compatible device (i.e., a CL device). When the authentication succeeds, connection is established between the first and second WFD compatible devices. The first WFD compatible device sets a MAC address of the second WFD compatible device in a management list of the first WFD compatible device. The management list is a list in which a MAC address of a CL device is set so as for a G/O device to manage the CL device.

As a result of the respective processing, the first WFD compatible device newly belongs to the WFDNW as a G/O device (i.e., it newly establishes a WFDNW) and the second WFD compatible device newly participates in the WFDNW as a CL device.

In a step where a WFDNW is newly established by the G/O negotiation, only one G/O device and one CL device belong to the WFDNW. At this time, the G/O device may establish connection with other device to thus enable the other device to newly participate in the WFDNW, as a CL device. In this case, two or more CL devices belong to the WFDNW. That is, in the WFDNW, one G/O device and one or more CL devices may exist. The G/O device manages one or more CL devices. Specifically, the G/O device sets MAC addresses of one or more CL devices in the management list in a memory of the G/O device. Also, when a CL device is disconnected from the WFDNW, the G/O device deletes the MAC address of the CL device from the management list. In the meantime, when the number of the CL devices becomes zero (that is, when the number of the MAC addresses of the CL devices set in the management list becomes zero), the G/O device is shifted from the G/O state to the device state and extinguishes the WFDNW.

The G/O device can perform wireless communication of target data with the CL device without through the other device. Also, the G/O device can relay wireless communication of the target data between a pair of CL devices. In other words, the pair of CL devices can perform wireless communication of the target data through the G/O device.

As described above, in the WFDNW, it is possible to perform wireless communication of the target data between the WFD compatible device of a transmission source of the target data and the WFD compatible device of a transmission destination of the target data, without through an AP (Access Point) separately configured from the WFD compatible devices. That is, it can be said that the WFD communication and the WFD mode are wireless communication without through an AP and a wireless communication method in which an AP is not used. In the meantime, the AP is a normal AP that is referred to as a wireless access point, a wireless LAN router and the like, and is different from a G/O device of the WFD mode and a so-called SoftAP of the normal Wi-Fi mode.

Also, the G/O device cannot perform wireless communication of the target data with a device-state device (i.e., the WFD compatible device at the device state) but can perform wireless communication of connection data for establishing connection with the device instrument. That is, the G/O device can perform wireless communication of connection data with the device-state device to thereby establish connection with the device instrument, thereby enabling the device-state device to newly participate in the WFDNW. In other words, the device-state device can perform wireless communication of connection data with the G/O device to thus establish connection with the G/O device, thereby newly participating in the WFDNW. In this case, the device-state device is shifted from the device state to the CL state (i.e., the device-state device participates in the WFDNW as a CL device). The connection data is data (i.e., data not including information of the network layer) including information of a lower layer (for example, a physical layer and a data link layer) of the network layer of the OSI reference model, and includes a Probe Request signal, a Probe Response signal, an Association Request signal, an Association Response signal, an Authentication Request signal, a 4-Way Handshake signal, an Invitation Request signal, an Invitation Response signal and the like.

Also, the G/O device cannot perform wireless communication of the target data with a WFD non-compatible device but can perform wireless communication of the connection data with a WFD non-compatible device. The WFD non-compatible device is a device that cannot operate in accordance with the WFD mode (i.e., a device that cannot selectively operate at any one of the three states of the WFD mode). The G/O device can perform wireless communication of the connection data with the WFD non-compatible device to thereby establish connection with the WFD non-compatible device, thereby enabling the WFD non-compatible device to newly participate in the WFDNW. In other words, the WFD non-compatible device can perform wireless communication of the connection data with the G/O device to thus establish connection with the G/O device, thereby newly participating in the WFDNW. Although the WFD non-compatible device does not selectively operate at any one of the three states (i.e., the G/O state, the CL state and the device state) but operates at the same state as the CL state while it belongs to the WFDNW.

(Normal Wi-Fi Communication)

The normal mode is a wireless communication method that is defined by the Wi-Fi Alliance, and is different from the WFD mode. The normal mode is a wireless communication method that performs wireless communication in accordance with IEEE 802.11 standards and standards (for example, 802.11a, 11b, 11g, 11n and the like) acting on the 802.11 standards, like the WFD mode.

However, as described above, while the WFD mode is a wireless communication method for performing wireless communication without through an AP, the normal Wi-Fi mode is a wireless communication method for performing wireless communication through an AP. Also, while the WFD mode is a wireless communication method having a structure of G/O negotiation, the normal Wi-Fi mode is a wireless communication method having no the structure. Also, while the WFD mode is a wireless communication method allowing a selective operation at any one of the three states (i.e., the G/O state, the CL state and the device state), the normal Wi-Fi mode is a wireless communication method not allowing the selective operation. In these regards, the WFD mode is different from the normal Wi-Fi mode.

A device that can perform normal Wi-Fi communication, such as respective devices 10, 50, 110, 120, is referred to as 'normal Wi-Fi compatible device'. When a normal Wi-FiNW is established by an AP, a normal Wi-Fi compatible device acquires normal Wi-Fi wireless setting information (hereinafter, referred to as 'normal Wi-FiWSI'), which is currently used in the normal Wi-FiNW, from the AP. The normal Wi-FiWSI is wireless setting information that is prepared by an AP, and includes an authentication method, an encryption method, a password, an SSID, a BSSID and the like, like the WFDWSI. The respective information is the same as the respective information included in the WFDWSI, except that it is used in the normal Wi-FiNW. In the meantime, the BSSID that is included in the normal Wi-FiWSI is a MAC address of an AP.

The normal Wi-Fi compatible device and the AP perform authentication communication, based on the normal Wi-FiWSI. When the AP executes authentication of the normal Wi-Fi compatible device and the authentication succeeds, connection is established between the AP and the normal Wi-Fi compatible device. Thereby, the normal Wi-Fi compatible device newly belongs to (participates in) the Normal Wi-FiNW.

(Configuration of MFP 10)

Subsequently, a configuration of the MFP 10 will be described. The MFP 110 has the same configuration as the MFP 10. The MFP 10 is a peripheral device that can execute multi-functions including printing and scan functions. The MFP 10 has an operation unit 12, a display unit 14, a print execution unit 16, a scan execution unit 18, a wireless LAN interface (hereinafter, an interface is referred to as 'I/F') 20 and a control unit 30. The respective units 12 to 30 are connected to a bus line (a reference numeral thereof is omitted).

The operation unit 12 has a plurality of keys. A user can input a variety of instructions to the MFP 10 by operating the operation unit 12. The display unit 14 is a display for displaying a variety of information. The print execution unit 16 is a print mechanism such as inkjet type and laser type. The scan execution unit 18 is a scan mechanism such as CCD and CIS.

The wireless LAN I/F 20 is an interface for performing WFD communication and normal Wi-Fi communication. The wireless LAN I/F 20 is physically one interface (i.e., one IC chip). However, the wireless LAN I/F 20 is allocated with both a MAC address (hereinafter, referred to as 'MAC address for WFD') that is used in the WFD communication and a MAC address (hereinafter, referred to as 'MAC address for normal Wi-Fi') that is used in the normal Wi-Fi communication. Specifically, the wireless LAN I/F 20 is beforehand allocated with the MAC address for normal Wi-Fi. The control unit 30 generates a MAC address for WFD different from the MAC address for normal Wi-Fi by using the MAC address for normal Wi-Fi and allots the MAC address for WFD to the wireless LAN I/F 20. Therefore, the control unit 30 can perform both the normal Wi-Fi communication using the MAC address for normal Wi-Fi and the WFD communication using the MAC address for WFD at the same time. That is, the MFP 10 can belong to both the WFDNW and the normal Wi-Fi at the same time.

In the meantime, the MFP 110 is also allocated with a MAC address for WFD and a MAC address for normal Wi-Fi. The MAC address for WFD of the MFP 10 is different from the MAC address for WFD of the MFP 110. Also, the MAC address for normal Wi-Fi of the MFP 10 is different from the MAC address for normal Wi-Fi of the MFP 110.

The control unit 30 has a CPU 32 and a memory 34. The memory 34 consists of a ROM, a RAM, a hard disk drive and the like. The CPU 32 executes a variety of processing in response to programs stored in the memory 34. The CPU 32 executes the processing in response to the programs, so that respective functions of respective units 41 to 46 are implemented.

The memory 34 also stores therein a WFD state value indicating a current state (i.e., the G/O state, the CL state or the device state) of the MFP 10 relating to the WFD. When the MFP 10 belongs to the WFDNW (i.e., the WFD state value indicates the G/O state or CL state), the memory 34 further stores therein WDFWSI that is currently used in the WFDNW. When the MFP 10 belongs to the normal Wi-FiNW, the memory 34 further stores therein normal Wi-Fi-WSI that is currently used in the normal Wi-FiNW.

(Configuration of Portable Terminal 50)

The portable terminal 50 is a portable terminal apparatus such as a portable phone (for example, smart phone), a PDA, a notebook PC, a tablet PC, a portable music reproduction apparatus, a portable moving picture reproduction apparatus and the like. The portable terminal 50 can perform WFD communication and normal Wi-Fi communication.

The portable terminal 50 has an operation unit 52, a display unit 54, a wireless LAN I/F 60 and a control unit 70. The respective units 52 to 70 are connected to a bus line (a reference numeral thereof is omitted). The operation unit 52 has a plurality of keys. A user can input a variety of instructions to the portable terminal 50 by operating the operation unit 52. The display unit 54 is a display for displaying a variety of information.

The wireless LAN I/F 60 is an interface for performing WFD communication and normal Wi-Fi communication. Unlike the wireless LAN I/F 20 of the MFP 10, the wireless LAN I/F 60 of the portable terminal 50 is allocated with only one MAC address. Therefore, the portable terminal 50 cannot belong to both the WFDNW and the normal Wi-FiNW at the same time. A MAC address of the portable terminal 50 is different from the MAC addresses for WFD and MAC addresses for normal Wi-Fi of the MFPs 10, 110.

The control unit 70 has a CPU 72 and a memory 74. The memory 74 consists of a ROM, a RAM, a hard disk drive and the like. The CPU 72 executes a variety of processing in response to programs stored in the memory 74. The program in the memory 74 includes an application 76 for enabling the MFPs 10, 110 to execute various functions (for example, print function, scan function and the like). The application 76 may be installed into the portable terminal 50 from a server, which is provided by vendors of the MFPs 10, 110, or may be installed into the portable terminal 50 from a media, which is shipped together with the MFPs 10, 110. The CPU 72 executes the processing in response to the application 76, so that functions of respective units 81 to 89 are implemented.

Like the MFP 10, the memory 74 further stores therein a WFD state value. Also, when the portable terminal 50 belongs to the WFDNW, the memory 74 further stores therein WFD-WSI. Also, when the portable terminal 50 belongs to the normal Wi-FiNW, the memory 74 further stores therein normal Wi-FiWSI.

(Configuration of PC 120)

The PC 120 has an OS (Operating System) program. The PC 120 can perform WFD communication and normal Wi-Fi communication in response to the OS program. The PC 120 is allocated with only one MAC address. The MAC address of the PC 120 is different from the MAC addresses for WFD and MAC addresses for normal Wi-Fi of the MFPs 10, 110 and is also different from the MAC address of the portable terminal 50.

Figure 2:
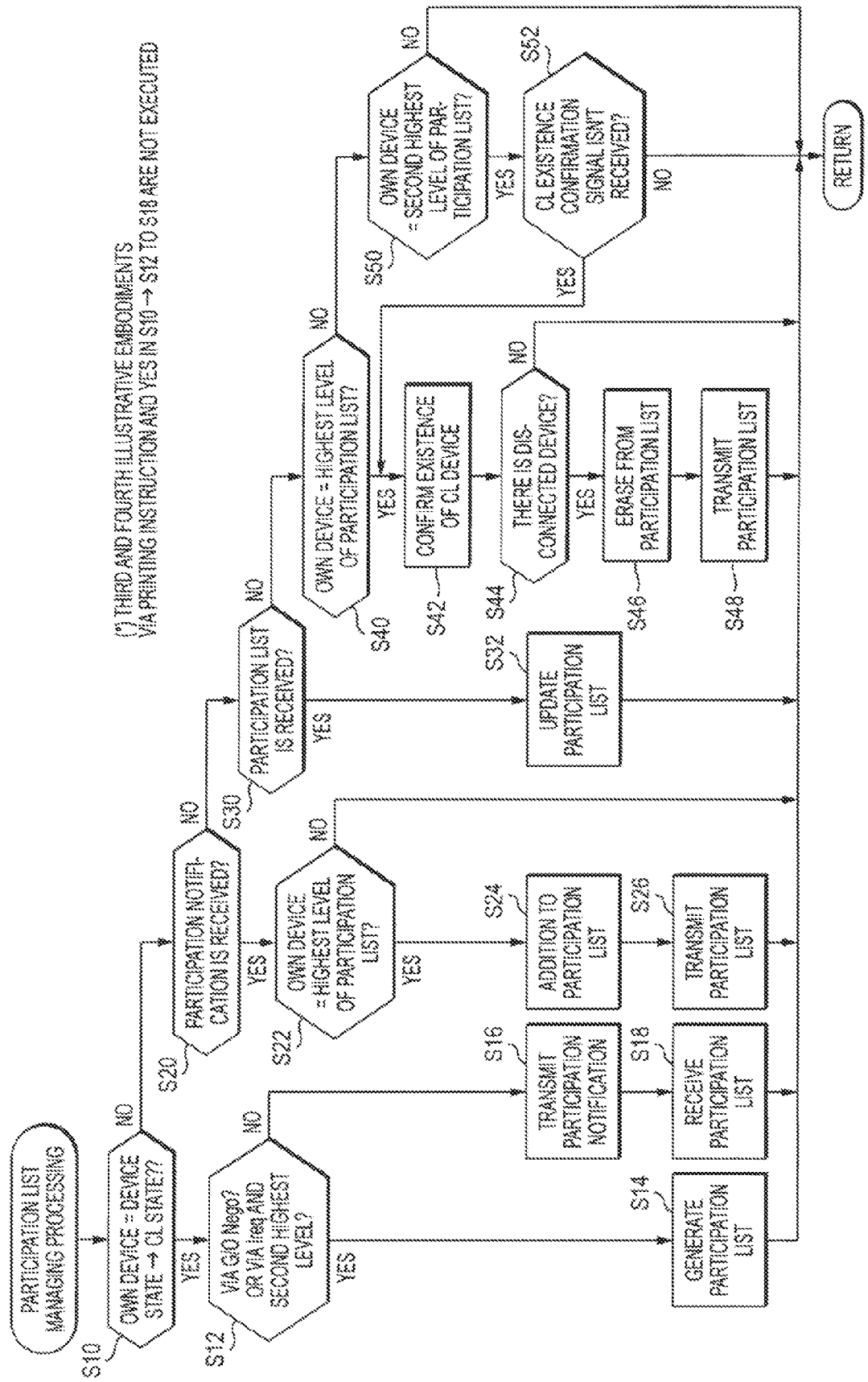
FIG. 2 illustrates a flowchart of participation list managing processing.

(Participation List Managing Processing; FIG. 2)

Subsequently, participation list managing processing that is executed by the MFP 10 will be described with reference to FIG. 2. Like the MFP 10, the portable terminal 50 and the MFP 110 also execute the participation list managing processing. The participation list managing processing is processing that is executed by the CL device. That is, the G/O device and the device-state device do not execute the participation list managing processing.

The participation list is a list in which MAC addresses of the respective CL devices belonging to the WFDNW are set. As described above, the G/O device has the management list in which the MAC addresses of the respective CL devices are set. The participation list is different from the management list, in that it is carried by the respective CL devices.

Although described later in detail, in the participation list, a MAC address of a CL device (i.e., a CL device in which a WFD connection operation (which will be described later) for participating in the WFDNW has been first executed) earlier belonging to the WFDNW is set at a higher level. For example, a situation where a WFDNW, to which a G/O device (for example, the PC 120), a first CL device (for example, the MFP 10) and a second CL device (for example, the MFP 110) belong, is established is assumed. When the first CL device is first enabled to belong to the WFDNW and the second CL device is then enabled to belong to the WFDNW, the MAC address of the first CL device is set at the highest level of the participation list and the MAC address of the second CL device is set at the second highest level of the participation list. In the meantime, the MAC address of the G/O device is not set in the participation list.

In S10, the control unit 30 determines whether the state of the MFP 10 is shifted from the device state to the CL state. As described above, the participation list managing processing is processing that is not executed by the device-state device but is executed by the CL device. Therefore, after the participation list managing processing starts as a result of the shift of the MFP 10 from the device state to the CL state, when the processing of S10 is executed for the first time, the control unit 30 determines YES in S10 and proceeds to S12.

In S12, the control unit 30 determines whether the MFP 10 is shifted to the CL state by executing the G/O negotiation. When the MFP 10 is shifted to the CL state in S10 by executing the G/O negotiation (for example, shift in S108 of FIG. 3, which will described later), the control unit 30 determines YES in S12 and proceeds to S14. Since a WFDNW is newly established as a result of the G/O negotiation, the description that the MFP 10 executes the G/O negotiation to thus belong to the WFDNW as a CL device (i.e., a result of the determination in S12 is YES) means that the first CL device belonging to the WFDNW is the MFP 10.

In S12, the control unit 30 further determines whether the MFP receives an Invitation Request signal (hereinafter, referred to as 'Ireq signal'), which will be described later, and is thus shifted to the CL state in S10 at a state where the MAC address for WFD of the MFP 10 is set at the second highest level of the participation list in the memory 34 (hereinafter, referred to as 'a state where the MFP 10 is at the second highest level'). When the MFP 10 receives an Ireq signal and is thus shifted to the CL state at the state where the MFP 10 is at the second highest level (for example, shift in S518 of FIG. 7, which will be described later), the control unit 30 determines YES in S12 and proceeds to S14.

In the meantime, the participation list that is a determination target in S12 has been stored in the memory 34 while the MFP 10 is at the CL state when it belonged to the WFDNW. For example, it is assumed that the state of the MFP 10 is shifted in order of a CL state (hereinafter, referred to as 'CL state (1)'), a device state and a CL state (hereinafter, referred to as 'CL state (2)'). That is, a situation is assumed in which, after the MFP 10 participates in a specific WFDNW at the CL state (1), the MFP 10 is disconnected from the specific WFDNW due to any reason and is shifted to the device state and again participates in a WFDNW (which may be the same network (NW) as or different from the specific WFDNW) at the CL state (2). In this case, the MFP 10 stores the participation list in the memory 34 while it is at the CL state (1). Even when the MFP 10 is shifted from the CL state (1) to the device state, it does not delete the participation list from the memory 34. Then, the MFP 10 is shifted from the device state to the CL state (2). At this time, the MFP 10 determines YES in S10 and executes the determination of S12. The participation list that is a determination target in S12 is stored in the memory 34 while the MFP 10 is at the CL state (1) and is maintained in the memory 34 without being deleted even when it is shifted to the device state.

The Ireq signal is a signal that is transmitted by the G/O device. The Ireq signal is a signal for requesting that a transmission destination device (for example, the MFP 10) of the Ireq signal newly belong to the existing WFDNW, as a CL device, to which a transmission source device (i.e., a G/O device) of the Ireq signal belongs. As described later in detail, the Ireq signal is a signal that, after the device of the highest level set in the participation list becomes a G/O device, is transmitted from the G/O device to respective devices of the second highest level and thereafter set in the participation list. At this time, the device of the highest level (i.e., a G/O device) first transmits the Ireq signal to the device of the second highest level in the participation list and then sequentially transmits the Ireq signal to respective devices of the third highest level and thereafter. Therefore, the description that the MFP 10 receives the Ireq signal at the state of the second highest level and belongs to the WFDNW as a CL device (i.e., a result of the determination in S12 is YES) means that the first CL device belonging to the WFDNW is the MFP 10.

As described above, the YES determination in S12 means that the first CL device (in the below, referred to as 'earliest CL device') belonging to the WFDNW is the MFP 10. In this situation, in S14, the control unit 30 generates a new participation list in which the MAC address for WFD of the MFP 10 is set and stores the new participation list in the memory 34. At the time of S14, the new participation list includes only the MAC address for WFD of the MFP 10. That is, the MAC address for WFD of the MFP 10 is set at the highest level of the participation list. In the meantime, at the time of S14, when an old participation list (for example, the participation list stored while the MFP is at the CL state (1)) has been stored in the memory 74, the control unit 30 deletes the old participation list from the memory 34 and stores the new participation list in the memory 34. When the processing of S14 is over, the control unit returns to S10.

On the other hand, when the MFP 10 is shifted to the CL state without executing the G/O negotiation and without receiving the Ireq signal, the control unit 30 determines NO in S12 and proceeds to S16. Regarding the situation where a result of the determination in S12 is NO, following two situations are considered.

For example, when a WFD connection operation for enabling a device at the device state to participate in the existing WFDNW is applied, the device at the device state newly participates in the existing WFDNW without executing the G/O negotiation and without receiving an Ireq signal and is thus shifted to the CL state (for example, a situation where a WFD connection operation (S120) is applied to the portable terminal 50 in FIG. 3, which will be described later). When the MFP 10 is shifted to the CL state in this situation, a result of the determination in S12 is NO.

Also, for example, when a device at the device receives an Ireq signal from a G/O device of the existing WFDNW at a state where the device is at the third highest level or lower of the participation list, the device at the device state newly participates in the existing WFDNW and is thus shifted to the CL state (for example, a situation where the MFP 110 receives an Ireq signal in FIG. 5, which will be described later). When the MFP 10 is shifted to the CL state in this situation, a result of the determination in S12 is NO.

In any situation, when the MFP 10 at the device state newly participates in the WFDNW, the CL device has already belonged to the WFDNW. Therefore, the MFP 10 is not the earliest CL device that has earliest participated in the WFDNW. In this situation, as described in S14, the earliest CL device has already generated the participation list. As described later, when the earliest CL device receives a participation notification from a CL device newly belonging to the WFDNW after generating the participation list, it adds a MAC address of the CL device to the participation list to thereby generate an updated participation list (S24). The earliest CL device further transmits the updated participation list to the other CL device belonging to the WFDNW (S26).

In S16, the control unit 30 broadcasts a participation notification, which indicates that the MFP 10 newly participates in the WFDNW, to the WFDNW so as to acquire the updated participation list from the earliest CL device. The participation notification includes the MAC address for WFD of the MFP 10. The participation notification is transmitted to the respective CL devices (i.e., the respective CL devices different from the MFP 10) belonging to the WFDNW through the G/O device.

When the earliest CL device receives the participation notification from the MFP 10, it sets the MAC address for WFD of the MFP 10 at the lowest level of the participation list to thereby generate an updated participation list. Then, the earliest CL device broadcasts the updated participation list to the WFDNW.

In S18, a reception unit 41 receives the participation list from the earliest CL device. As described above, the MAC address for WFD of the MFP 10 is set at the lowest level of the received participation list. In S18, a registration unit 43 stores the received participation list in the memory 34. In the meantime, when the old participation list has been stored in the memory 34, the control unit 30 deletes the old participation list from the memory 34 and stores the received participation list in the memory 34. When the processing of S18 is over, the control unit returns to S10

In S20, the reception unit 41 monitors whether the participation notification is received. When a new CL device different from the MFP 10 participates in the WFDNW, the new CL device broadcasts the participation notification including the MAC address of the new CL device to the WFDNW (S16). In this case, the reception unit 41 receives the participation notification from the new CL device through the G/O device. As a result, the control unit determines YES in S20 and proceeds to S22.

In S22, the control unit 30 determines whether the MAC address for WFD of the MFP 10 is set at the highest level of the participation list in the memory 34. That is, the control unit 30 determines whether the MFP 10 is the earliest CL device or not. When the MFP 10 is the earliest CL device, the control unit 30 determines YES in S22 and proceeds to S24. When the MFP 10 is not the earliest CL device, the control unit 30 determines NO in S22, skips over S24 to S26 and returns to S10

In S24, the registration unit 43 sets the MAC address (i.e., the MAC address of the new CL device) included in the participation notification at the lowest level of the participation list to thereby generate an updated participation list. Thereby, the updated participation list is stored in the memory 34.

Then, in S26, the control unit 30 broadcasts the updated participation list to the WFDNW. The participation list is transmitted to the respective CL devices (i.e., the respective CL devices different from the MFP 10) belonging to the WFDNW through the G/O device. As a result, the respective CL devices receive and store the participation list in S18 or update the participation list in S32. When the processing of S26 is over, the control unit returns to S10.

In S30, the reception unit 41 monitors whether the participation list is received. In S26 or S48 (which will be described later), the earliest CL device different from the MFP 10 can broadcast the participation list to the WFDNW. In this case, the reception unit 41 receives the participation list from the earliest CL device through the G/O device. As a result, the control unit determines YES in S30 and proceeds to S32.

In S32, the registration unit 43 deletes the old participation list from the memory 34 and stores the received participation list in the memory 34. Thereby, the registration unit 43 can update the participation list. When the processing of S32 is over, the control unit returns to S10.

In S40, the control unit 30 determines whether the MAC address for WFD of the MFP 10 is set at the highest level of the participation list in the memory 34. That is, the control unit 30 determines whether the MFP 10 is the earliest CL device. When the MFP 10 is the earliest CL device, the control unit 30 determines YES in S40 and proceeds to S42.

In S42, the control unit 30 executes an existence confirmation of the respective CL device different from the MFP 10 that is the earliest CL device. Specifically, the control unit 30 first transmits each CL existence confirmation signal, which includes, as a transmission destination, respective MAC addresses set at the second highest level and lower of the participation list, to the G/O device. Each CL existence confirmation signal is transmitted to each CL device through the G/O device.

When each CL device receives the CL existence confirmation signal from the MFP 10, it transmits a response signal, which includes the MAC address of the CL device, to the MFP 10 through the G/O device. However, for example, when a power supply of the CL device is off, when the CL device is located at a position at which it cannot perform wireless communication with the G/O device, and the like, the CL device is disconnected from the WFDNW. Since the disconnected device does not receive the CL existence confirmation signal, it does not transmit a response signal to the MFP 10. Therefore, the control unit 30 can determine whether there is a disconnected device in the respective CL devices registered with the participation list, by monitoring whether a response signal is received.

In S44, the control unit 30 determines whether there is a disconnected device. When there is a disconnected device, the control unit 30 determines YES in S44 and proceeds to S46. On the other hand, when there is no disconnected device, the control unit 30 determines NO in S44, skips over S46 and S48 and returns to S10.

In S46, the registration unit 43 deletes the MAC address of the disconnected device from the participation list in the memory 34, thereby generating an updated participation list.

Then, in S48, the control unit 30 broadcasts the updated participation list to the WFDNW. The participation list is transmitted to the respective CL devices (i.e., the respective CL devices except for the disconnected device, which are different from the P 10) belonging to the WFDNW, through the G/O device. As a result, the respective CL devices update the participation list (S32).

Whenever the control unit 30 determines YES in S40, it executes processing of S42 to S48. That is, the control unit 30 repeatedly confirms whether the CL device exists. For example, in a situation where an interval for executing the determination of S40 is substantially constant, the control unit 30 periodically confirms whether the CL device exists. When the processing of S48 is over, the control unit returns to S10.

As described above, in S40 to S48, the MFP 10 that is the earliest CL device confirms whether the CL device exists. In other words, when the earliest CL device is another CL device different from the MFP 10, another CL device executes the existence confirmation. However, there is a possibility that another CL device will be disconnected from the WFDNW. In this case, there is no CL device executing the existence confirmation, so that the participation list is not updated. In order to prevent this situation, the control unit 30 executes processing of S50 and S52, which will be described later.

In S50, the control unit 30 determines whether the MFP 10 is at the second highest state (i.e., the MAC address for WFD of the MFP 10 is set at the second highest level of the participation list). When the MFP 10 is at the second highest state, the control unit 30 determines YES in S50 and proceeds to S52. On the other hand, when the MFP 10 is not at the second highest state, the control unit 30 determines NO in S50, skips over S52 and returns to S10.

In S52, the control unit 30 determines whether a state, during which the CL existence confirmation signal is not received, continues for a predetermined time period. When the earliest CL device is disconnected from the WFDNW, the CL existence confirmation signal is not transmitted from the earliest CL device. In this case, since the CL existence confirmation signal is not received for the predetermined time period, the control unit 30 determines YES in S52 and executes S42 to S48.

That is, the control unit 30 transmits the CL existence confirmation signal, instead of the earliest CL device (S42). As a result, the control unit determines that the earliest CL device is disconnected from the WFDNW (YES in S44). Then, the registration unit 43 deletes the MAC address of the earliest CL device from the participation list in the memory 34 to thereby generate an updated participation list (S46). As a result, in the updated participation list, the MAC address for WFD of the MFP 10 is set at the highest level. That is, the MFP 10 becomes the earliest CL device. Then, the control unit 30 broadcasts the updated participation list to the WFDNW (S48).

In the meantime, like the MFP 10, the portable terminal 50 and the MFP 110 execute the participation list managing processing of FIG. 2. When the portable terminal 50 executes the participation list managing processing, a control unit 70, a reception unit 81 and a registration unit 83 execute the respective processing of FIG. 2, instead of the control unit 30, the reception unit 41 and the registration unit 43. Since the respective devices 10, 50, 110 execute the participation list managing processing, when each device 10 and the like are the CL devices, the respective devices 10 and the like can carry therein the participation list in which the MAC addresses of the respective devices 10 and the like are set.

In the meantime, the PC 120 does not execute the participation list managing processing. Therefore, it is not necessary to install a special program (for example, the application 76 of the portable terminal 50) for executing the participation list managing processing in the PC 120. Since the PC 120 does not execute the participation list managing processing, the MAC address of the PC 120 is not set in the participation list even though the PC 120 belongs to the WFDNW as a CL device. Therefore, even though processing of FIG. 5 and thereafter is executed (which will be described later) at a state where the PC 120 is at the CL state, when the G/O device is disconnected from the WFDNW, the PC 120 cannot belong to a new WFDNW. However, the other devices 10, 50, 110 can appropriately belong to the new WFDNW. That is, the technology of the illustrative embodiment effectively functions not only in a situation where the WFDNW is established to which only the respective devices 10, 50, 110 capable of executing the participation list managing processing belong but also in a situation where the WFDNW is established to which the device 120, which cannot execute the participation list managing processing, also belongs. Meanwhile, in a modified embodiment, the PC 120 may have the special program and execute the participation list managing processing.

(Aspect of Establishing WFDNW; FIG. 3)

Figure 3:
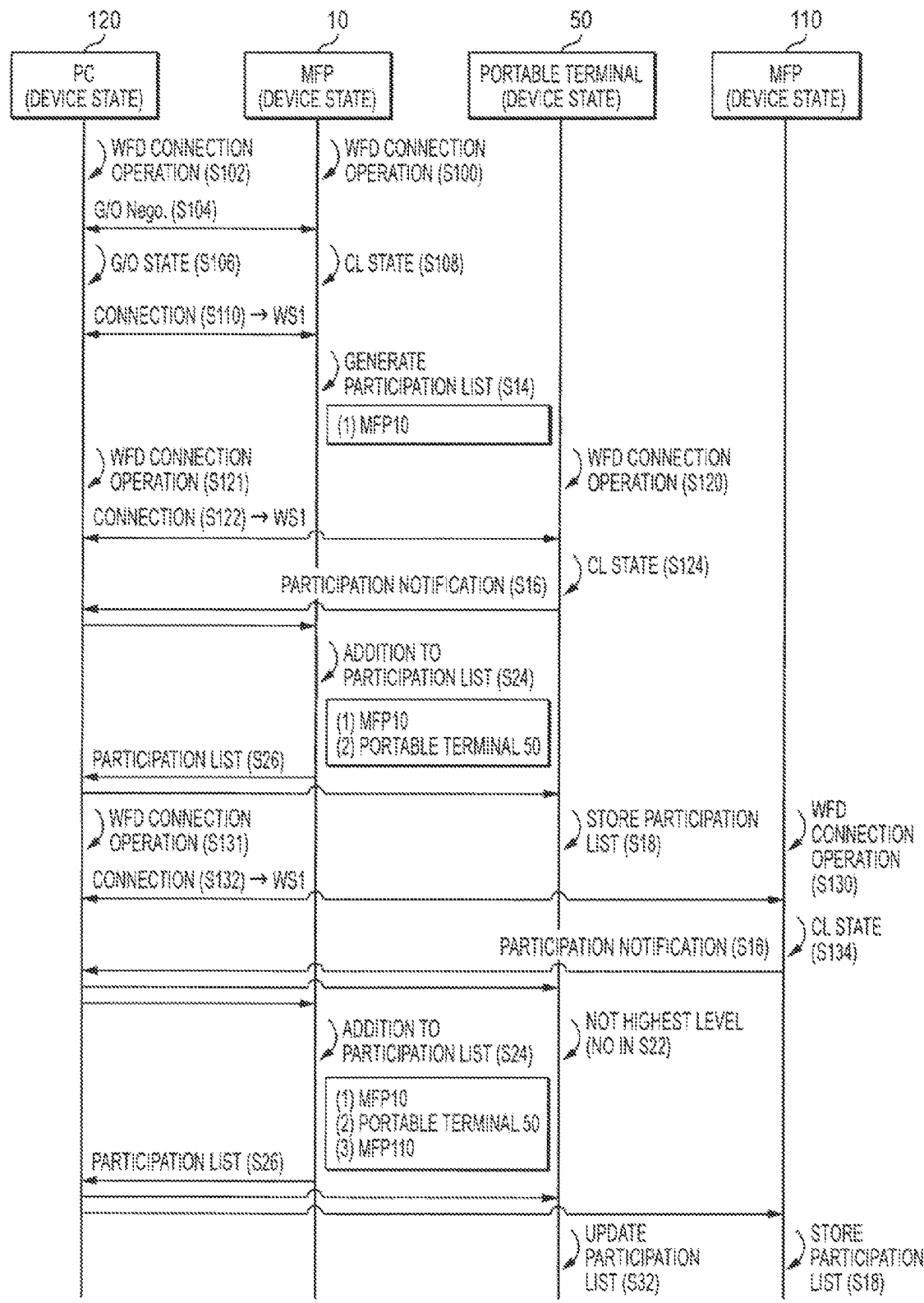
FIG. 3 is a sequence diagram illustrating an aspect of establishing a wireless network.

At an initial state of FIG. 3, a WFDNW is not established and the respective devices 10, 50, 110, 120 are at the device state.

In S100, a user applies a WFD connection operation for enabling the MFP 10 to belong to the WFDNW to the MFP 10. Specifically, the user selects an item indicating 'wireless connection of the WFD mode' from a plurality of items (for example, 'wireless connection of the WFD mode' and 'wireless connection of the normal Wi-Fi mode') included in a screen that is displayed on the display unit 14. In S102, the user applies a WFD connection operation (i.e., an operation of selecting an item indicating 'wireless connection of the WFD mode') for enabling the PC 120 to belong to the WFDNW to the PC 120.

In S104, the control unit 30 of the MFP 10 executes the G/O negotiation with the PC 120. In S106, the PC 120 determines that the PC 120 is at the G/O state as a result of the G/O negotiation. Also, in S108, the control unit 30 of the MFP 10 determines that the MFP 10 is at the CL state as a result of the G/O negotiation.

In S110, the PC 120 prepares WFDWSI (hereinafter, referred to as 'WS1') that should be used in the WFDNW and supplies the WS1 to the MFP 10. As a result, connection is established between the PC 120 and the MFP 10. Thereby, the PC 120 newly establishes a WFDNW (hereinafter, referred to as 'first WFDNW') as a G/O device and the MFP 10 participates in the first WFDNW as a CL device. The control unit 30 of the MFP 10 stores the WFD state value indicating the CL state and the WS1 in the memory 34.

Since the MFP 10 is shifted from the device state to the CL state by executing the G/O negotiation, the MFP 10 is the earliest CL device. Therefore, the control unit 30 of the MFP 10 generates the participation list in which the MAC address for WFD of the MFP 10 is set at the highest level (YES in S10 and YES in S12 of FIG. 2, S14). In respective figures (FIGS. 3 to 12) after FIG. 3, the participation list is expressed with a rectangular box having no reference numeral attached thereto and a ranking in the participation list (i.e., an order participating in the WFDNW) is expressed with a number in a circle. The 'MFP 10', the 'MFP 110' and the 'portable terminal 50' in the participation list mean that the MAC address for WFD of the MFP 10, the MAC address for WFD of the MFP 110 and the MAC address of the portable terminal 50 are set in the participation list.

Then, in S120, the user applies to the portable terminal 50 a WFD connection operation (i.e., an operation of selecting an item indicating 'wireless connection of the WFD mode') for enabling the portable terminal 50 to belong to the first WFDNW. In this case, the control unit 70 of the portable terminal 50 transmits a connection request to the PC 120 that is a G/O device. Also, in S121, the user applies the WFD connection operation (i.e., an operation of selecting an item indicating 'wireless connection of the WFD mode') to the PC 120 that is a G/O device, too. Thereby, in S122, when the PC 120 receives the connection request from the portable terminal 50, the PC supplies the WS1, which is currently used in the first WFDNW, to the portable terminal 50. As a result, connection is established between the PC 120 and the portable terminal 50. Thereby, in S124, the portable terminal 50 is shifted from the device state to the CL state and newly participates in the first WFDNW, as a CL device.

The portable terminal 50 is shifted from the device state to the CL state without executing the G/O negotiation and without receiving the Ireq signal (YES in S10 and NO in S12 of FIG. 2). Hence, the control unit 70 of the portable terminal 50 broadcasts the participation notification including the MAC address of the portable terminal 50 (S16 of FIG. 2).

The reception unit 41 of the MFP 10 receives the participation notification from the portable terminal 50 through the PC 120 (S20 of FIG. 2). Since the MFP 10 is the earliest CL device (YES in S22), the registration unit 43 of the MFP 10 adds the MAC address of the portable terminal 50 to the lowest level of the participation list (S24). Then, the control unit 30 of the MFP 10 broadcasts the participation list to the first WFDNW (S26).

The reception unit 81 of the portable terminal 50 receives the participation list from the MFP 10 through the PC 120 (S18 in FIG. 2). Then, the registration unit 83 of the portable terminal 50 stores the participation list in the memory 74 (S18).

Then, in S130, the user applies to the MFP 110 a WFD connection operation (i.e., an operation of selecting an item indicating 'wireless connection of the WFD mode') for enabling the MFP 110 to belong to the first WFDNW. In this case, the MFP 110 transmits a connection request to the PC 120 that is a G/O device. Also, in S131, the user applies the WFD connection operation (i.e., an operation of selecting an item indicating 'wireless connection of the WFD mode') to the PC 120 that is a G/O device, too. Thereby, in S132, when the PC 120 receives the connection request from the MFP 110, the PC supplies the WS1, which is currently used in the first WFDNW, to the MFP 110. As a result, connection is established between the PC 120 and the MFP 110. Thereby, in S134, the MFP 110 is shifted to the CL state and newly participates in the first WFDNW, as a CL device.

The MFP 110 is shifted from the device state to the CL state without executing the G/O negotiation and without receiving the Ireq signal (YES in S10 and NO in S12 of FIG. 2). Therefore, the MFP 110 broadcasts the participation notification including the MAC address for WFD of the MFP 110 (S16 of FIG. 2).

The reception unit 81 of the portable terminal 50 receives the participation notification from the portable terminal 50 through the PC 120 (S20 in FIG. 2). Since the portable terminal 50 is not the earliest CL device (NO in S22), the control unit 70 of the portable terminal 50 does not execute the processing of S24 and S26 even though it receives the participation notification.

The reception unit 41 of the MFP 10 receives the participation notification from the portable terminal 50 through the PC 120 (S20 of FIG. 2). Since the MFP 10 is the earliest CL device (YES in S22), the registration unit 43 of the MFP 10 sets the MAC address for WFD of the MFP 110 at the lowest level of the participation list to thereby generate an updated participation list (S24). Then, the control unit 30 of the MFP 10 broadcasts the updated participation list to the first WFDNW (S26).

The reception unit 81 of the portable terminal 50 receives the participation list from the MFP 10 through the PC 120 (YES in S30 of FIG. 2). Then, the registration unit 83 of the portable terminal 50 updates the participation list in the memory 74 (S32).

The MFP 110 receives the participation list from the MFP 10 through the PC 120 (S18 in FIG. 2). Then, the MFP 110 stores the participation list in a memory (not shown) of the MFP 110 (S18).

As described above, when the respective processing of FIG. 3 is executed, the first WFDNW is established in which the PC 120 is a G/O device and the MFPs 10, 110 and the portable terminal 50 are CL devices. Thereby, for example, the portable terminal 50 can transmit the print data to the MFP 10 through the PC 120 (i.e., G/O device) by using the first WFDNW so as to enable the MFP 10 to perform a printing operation. In this case, the control unit 30 of the MFP 10 receives the print data from the portable terminal 50 through the PC 120 (i.e., G/O device) by using the first WFDNW. Then, the control unit 30 of the MFP 10 supplies the print data to the print execution unit 16, thereby enabling the print execution unit 16 to execute a printing operation.

Figure 4:
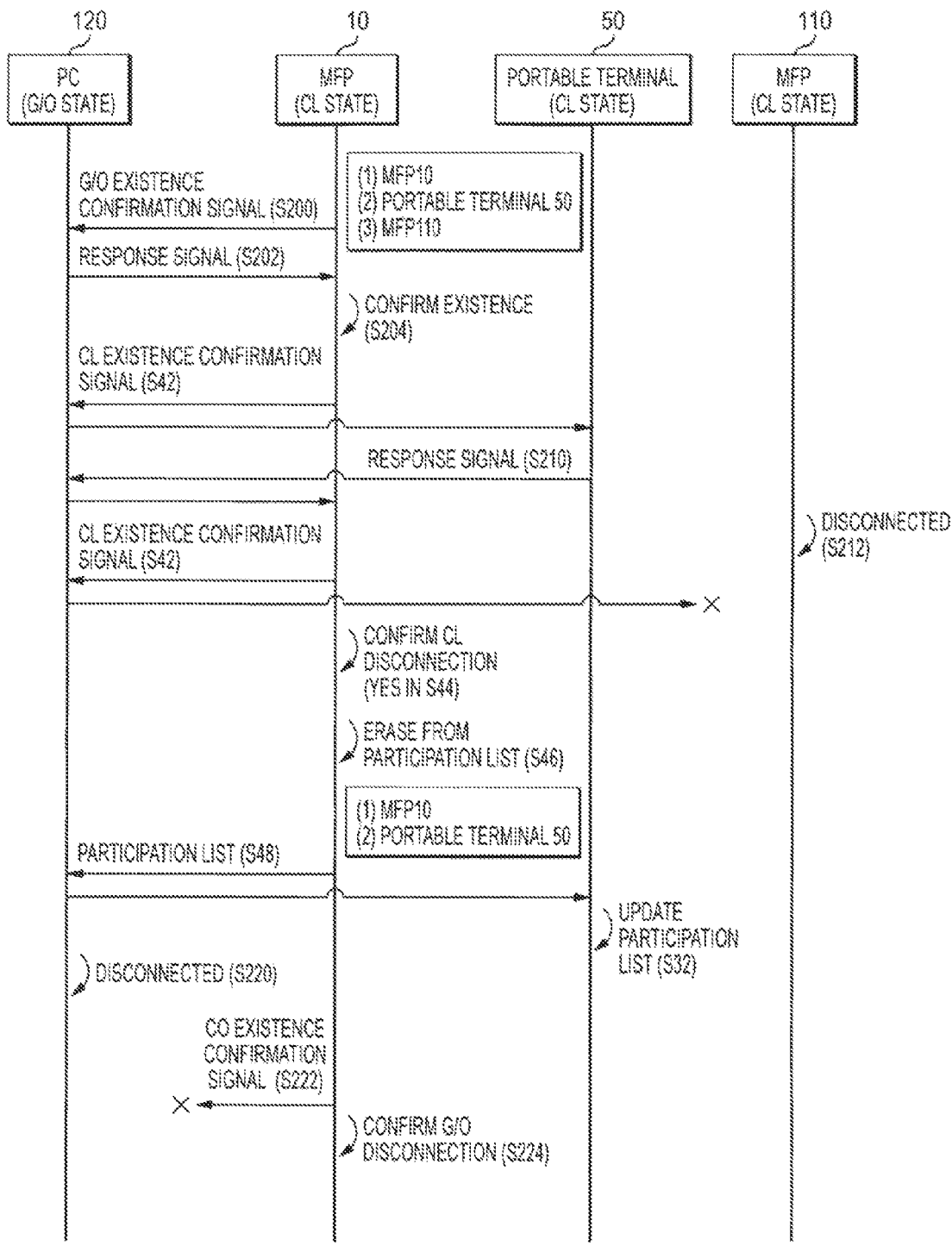
FIG. 4 is a sequence diagram illustrating an aspect of confirming whether a G/O device and a client device exist.

(Aspect of Confirming Whether G/O Device and Client Device Exist; FIG. 4)

Subsequently, respective processing for confirming whether the G/O device and the client device exist is set with reference to FIG. 4. At an initial state of FIG. 4, the first WFDNW is established in which the PC 120 is a G/O device and the MFPs 10, 110 and the portable terminal 50 are CL devices. The participation list includes the respective MAC addresses of the MFP 10, the portable terminal 50 and the MFP 110 in order from the higher level.

Each CL device normally confirms whether a G/O device exists. Therefore, in S200, a confirmation unit 45 of the MFP 10 that is a CL device confirms whether there is the PC 120 that is a G/O device. Specifically, the confirmation unit 45 transmits a G/O existence confirmation signal to the PC 120.

In the step of S200 in which the G/O existence confirmation signal is transmitted, the PC 120 is not disconnected from the first WFDNW. Thus, in S202, the PC 120 receives the G/O existence confirmation signal from the MFP 10 and transmits a response signal to the MFP 10.

In S204, since the confirmation unit 45 of the MFP 10 receives the response signal from the PC 120, the MFP 10 confirms that the PC 120 belongs to the first WFDNW, i.e., the PC 120 is not disconnected from the first WFDNW. In the meantime, the confirmation unit 45 repeatedly confirms whether the G/O device (i.e., the PC 120) exists. For example, in a situation where an interval for executing the existence confirmation of the G/O device is substantially constant, the confirmation unit 45 periodically confirms whether the G/O device exists.

Although not shown in FIG. 4, a confirmation unit 85 of the portable terminal 50 also repeatedly confirms whether the G/O device (i.e., the PC 120) exists, like the MFP 10. The MFP 110 also repeatedly confirms whether the G/O device (i.e., the PC 120) exists, like the MFP 10.

In the example of FIG. 4, the MFP 10 is the earliest CL device. Therefore, the control unit 30 of the MFP 10 execute confirms whether the respective CL devices (i.e., the portable terminal 50 and the MFP 110) different from the MFP 10 exist (YES in S40 of FIG. 2, S42). Specifically, the control unit 30 transmits a CL existence confirmation signal, which includes, as a transmission destination, the MAC address of the portable terminal 50 set at the second highest level of the participation list, to the PC 120.

Since the portable terminal 50 is not disconnected from the first WFDNW, the control unit 70 of the portable terminal 50 receives the CL existence confirmation signal from the MFP 10 through the PC 120. In this case, in S210, the control unit 70 transmits a response signal, which includes the MAC address of the portable terminal 50, to the MFP 10 through the PC 120.

Since the control unit 30 of the MFP 10 receives the response signal from the portable terminal 50, the control unit 30 confirms that the portable terminal 50 belongs to the first WFDNW, i.e., the portable terminal 50 is not disconnected from the first WFDNW. Then, the control unit 30 transmits a CL existence confirmation signal, which includes, as a transmission destination, the MAC address for WFD of the MFP 110 set at the lowest level of the participation list, to the PC 120.

For example, as a power supply of the MFP 110 becomes off, the MFP 110 is disconnected from the first WFDNW, in S212. In this case, since the MFP 110 does not receive a CL existence confirmation signal, it does not transmit a response signal.

Since the control unit 30 of the MFP 10 does not receive a response signal from the MFP 110, it confirms that the MFP 110 does not belong to the first WFDNW, i.e., the MFP 110 is disconnected from the first WFDNW (YES in S44 of FIG. 2). In this case, the registration unit 43 of the MFP 10 deletes the MAC address for WFD of the MFP 110 from the participation list (S46). Then, the control unit 30 of the MFP 10 broadcasts the participation list to the first WFDNW (S48).

The reception unit 81 of the portable terminal 50 receives the participation list from the MFP 10 through the PC 120 (YES in S30 of FIG. 2). Then, the registration unit 83 of the portable terminal 50 updates the participation list in the memory 74 (S32).

For example, as a power supply of the PC 120 that is a G/O device becomes off, the PC 120 is disconnected from the first WFDNW, in S220. After that, in S222, the confirmation unit 45 of the MFP 10 transmits a G/O existence confirmation signal to the PC 120. However, since the PC 120 does not receive a G/O existence confirmation signal, it does not transmit a response signal. In S224, since the confirmation unit 45 of the MFP 10 does not receive a response signal from the PC 120, it confirms that the PC 120 does not belong to the first WFDNW, i.e., the PC 120 is disconnected from the first WFDNW.

In the meantime, although not shown in FIG. 4, the confirmation unit 85 of the portable terminal 50 also transmits the G/O existence confirmation signal to the PC 120 but does not receive a response signal. As a result, the confirmation unit 85 of the portable terminal 50 confirms that the PC 120 is disconnected from the first WFDNW.

As described above, the CL device such as the MFP 10 and the portable terminal 50 can appropriately confirm whether the PC 120 (i.e., a G/O device) is disconnected from the first WFDNW by transmitting the G/O existence confirmation signal to the PC 120 (i.e., a G/O device) and determining whether the response signal is received from the PC 120. As a result, the MFP 10 or portable terminal 50 can transmit an Ireq signal (which will be described later) at appropriate timing. In the below, processing that is executed by the CL device when the PC 120 (i.e., a G/O device) is disconnected from the first WFDNW will be described (refer to FIGS. 5 to 7).

(Case A; FIG. 5)

Figure 5:
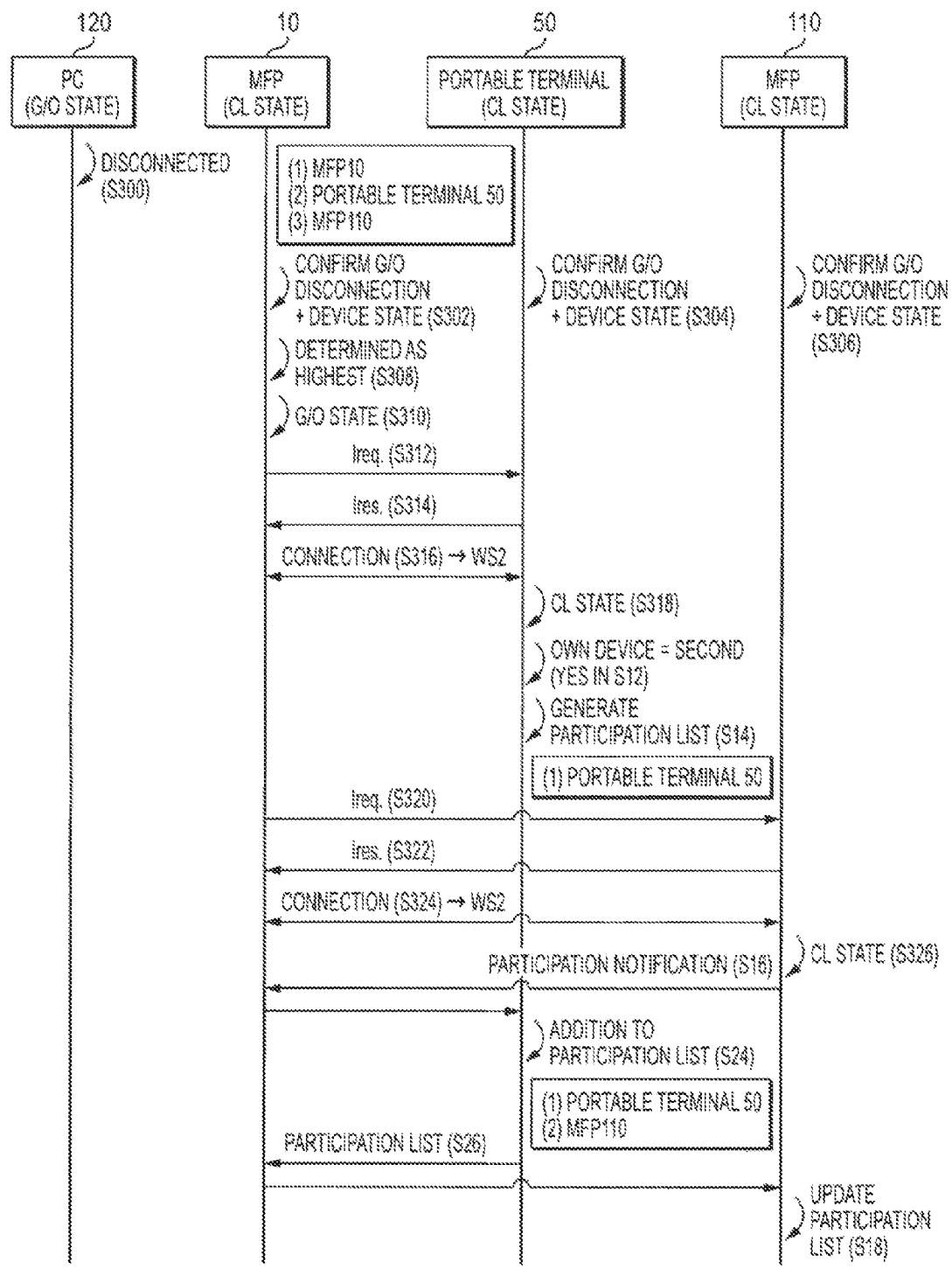
FIG. 5 is a sequence diagram of a case A where an MFP is the earliest CL device.

At an initial state of a case A of FIG. 5, the first WFDNW is established in which the PC 120 is a G/O device and the MFPs 10, 110 and the portable terminal 50 are CL devices. Also, the participation list includes the respective MAC addresses of the MFP 10, the portable terminal 50 and the MFP 110 in order from the higher level. That is, the MFP 10 is the CL device earliest participating in the first WFDNW.

In S300, the PC 120 that is a G/O device is disconnected from the first WFDNW. Thereby, the first WFDNW that is established at the initial state of FIG. 5 is extinguished. In this case, in S302, the confirmation unit 45 of the MFP 10 confirms that the PC 120 is disconnected from the first WFDNW and shifts the state of the MFP 10 from the CL state to the device state. That is, the confirmation unit 45 changes the WFD state value in the memory 34 from a value indicating the CL state to a value indicating the device state and deletes the WFDWSI in the memory 34. In the meantime, the participation list is not deleted from the memory 34 and is maintained in the memory 34.

Likewise, in S304, the confirmation unit 85 of the portable terminal 50 confirms that the PC 120 is disconnected from the first WFDNW and shifts the state of the portable terminal 50 from the CL state to the device state. Also, in S306, the MFP 110 confirms that the PC 120 is disconnected from the first WFDNW and shifts the state of the MFP 110 from the CL state to the device state. Since the respective devices 10, 50, 110 operate at the device state, the respective devices cannot perform wireless communication of target data. For example, the portable terminal 50 cannot transmit print data to the MFP 10 (or MFP 110).

When the MFP 10 is shifted from the CL state to the device state, the control unit 30 of the MFP 10 determines whether the MAC address for WFD of the MFP 10 is set at the highest level of the participation list in the memory 34. That is, the control unit 30 determines whether the MFP 10 is the earliest CL device of the first WFDNW. In S308, the control unit 30 determines that the MFP 10 is the earliest CL device. In this case, the control unit 30 executes processing of S310 to S316, which will be described later.

In the meantime, the control unit 70 of the portable terminal 50 determines that the portable terminal 50 is not the earliest CL device of the first WFDNW. Also, the MFP 110 determines that the MFP 110 is not the earliest CL device of the first WFDNW. In this case, the portable terminal 50 and the MFP 110 stand by until an Ireq signal is received from the earliest CL device (i.e., the MFP 10) of the first WFDNW.

In S310, a forming unit 46 of the MFP 10 shifts the state of the MFP 10 from the device state to the G/O state. As described above, when newly establishing a WFDNW, the G/O negotiation is generally executed, so that a G/O device and a client device are determined. In S310, the forming unit 46 shifts the state of the MFP 10 from the CL state to the G/O state without executing the G/O negotiation. When the processing of S310 is executed, the MFP 10 becomes a G/O device. However, a client device does not exist. In other words, when the processing of S310 is executed, it can be said that a WFDNW (hereinafter, referred to as 'second WFDNW') to which only a G/O device (i.e., the MFP 10) belongs is newly established.

More specifically, in S310, the forming unit 46 changes the WFD state value in the memory 34 from a value indicating the device state to a value indicating the G/O state. The forming unit 46 also prepares a WFDWSI (hereinafter, referred to as 'WS2'), which should be used in the second WFDNW, and stores the WS2 in the memory 34.

Since the MFP 10 executes the processing of S310, it operates as a G/O device. Therefore, the MFP 10 can transmit an Ireq signal, which can be transmitted only by a GO device, thereby enabling the portable terminal 50 and the MFP 110 to participate in the second WFDNW, in S312 and S320 that will be described later.

In S312, a transmission unit 42 of the MFP 10 extracts the MAC address of the portable terminal 50, which is set at the second highest level of the participation list in the memory 34. Then, the transmission unit 42 transmits an Ireq signal, which includes the MAC address of the portable terminal 50 as a transmission destination. Thereby, the MFP 10 can request that the portable terminal 50 newly participate in the second WFDNW as a CL device.

When the Ireq signal is received from the MFP 10, the control unit 70 of the portable terminal 50 transmits an Invitation Request signal (hereinafter, referred to as 'Ires signal').

In S314, an establishment unit 44 of the MFP 10 receives the Ires signal from the portable terminal 50. Then, in S316, an establishment unit 84 supplies the WS2 to the portable terminal 50. As a result, connection is established between the MFP 10 and the portable terminal 50.

In S318, the control unit 70 of the portable terminal 50 shifts the state of the portable terminal 50 from the device state to the CL state. That is, the control unit 70 stores the WFD state value indicating the CL state and the WS2 in the memory 74. Thereby, the portable terminal 50 newly participates in the second WFDNW, as a CL device.

Since the portable terminal 50 is shifted from the device state to the CL state, the control unit 70 of the portable terminal 50 determines YES in S10 of FIG. 2. Since the portable terminal 50 receives the Ireq signal at the second highest level state and is shifted to the CL state, the control unit 70 determines YES in S10 of FIG. 2. Therefore, the control unit 70 generates a new participation list in which the MAC address of the portable terminal 50 is set at the highest level and stores the new participation list in the memory 74, instead of the old participation list in which the MAC address of the portable terminal 50 is set at the third highest level or lower (S14).

Then, like the portable terminal 50, the control unit 30 of the MFP 10 enables the MFP 110 to participate in the second WFDNW. That is, in S320, the transmission unit 42 of the MFP 10 transmits an Ireq signal, which includes, as a transmission destination, the MAC address for WFD of the MIT 110 set at the third highest level (i.e., the lowest level) of the participation list in the memory 34. Like this, the transmission unit 42 transmits the respective Ireq signals by using the respective MAC addresses, in order from the higher level of the participation list. In S322, the establishment unit 44 of the MFP 10 receives the Ires signal from the MFP 110. In S324, the establishment unit 44 supplies the WS2 to the MFP 110. As a result, connection is established between the MFP 10 and the MFP 110.

In S326, the MFP 110 shifts the state of the MFP 110 from the device state to the CL state. Thereby, the MFP 110 newly participates in the second WFDNW, as a CL device. The MFP 110 determines YES in S10 of FIG. 2 and also determines NO in S12. Therefore, the MFP 110 broadcasts the participation notification including the MAC address for WFD of the MFP 10 to the second WFDNW.

The reception unit 81 of the portable terminal 50 receives the participation notification from the MFP 110 through the MFP 10 (i.e., a G/O device). In this case, the control unit 70 of the portable terminal 50 determines YES in S20 of FIG. 2, determines YES in S22 and proceeds to S24. The registration unit 83 of the portable terminal 50 sets the MAC address for WFD of the MFP 110, which is included in the participation notification, at the lowest level of the participation list, thereby generating an updated participation list (S24). Then, the control unit 70 of the portable terminal 50 broadcasts the updated participation list to the second WFDNW (S26).

When the MFP 110 receives the participation list from the portable terminal 50 (S18 in FIG. 2), it stores the received participation list in the memory (not shown) of the MFP 110, instead of the old participation list (S18).

(Effects of Case A)

As shown in FIG. 3, the MFP 10 receives the participation notification including the MAC address of the portable terminal 50 through the PC 120 (i.e., a G/O device) and sets the MAC address of the portable terminal 50 in the participation list (S24 in FIG. 2). Also, the MFP 10 receives the participation notification including the MAC address for WFD of the MFP 110 through the PC 120 and sets the MAC address for WFD of the MFP 110 in the participation list (S24 in FIG. 2). Then, as shown in FIG. 5, when the PC 120 (i.e., a G/O device) is disconnected from the first WFDNW (S300), the MFP 10 establishes the second WFDNW to which the MFP 10 belongs as a G/O device (S310).

Then, the MFP 10 transmits the Ireq signal to the portable terminal 50 by using the MAC address of the portable terminal 50 in the participation list (S312) and supplies the WS2 to the portable terminal 50 (S316). Thereby, the MFP 10 can appropriately establish a state where the MFP 10 and the portable terminal 50 belong to the second WFDNW. As a result, for example, in order to enable the MFP 10 to execute a printing operation, the portable terminal 50 can transmit the print data to the MFP 10 by using the second WFDNW, without through the other apparatus (for example, the PC 120).

Also, the MFP 10 transmits the Ireq signal to the MFP 110 by using the MAC address for WFD of the MFP 110 in the participation list (S320) and supplies the WS2 to the MFP 110 (S324). Thereby, the MFP 10 can appropriately establish a state where the MFPs 10, 110 and the portable terminal 50 belong to the second WFDNW. As a result, for example, in order to enable the MFP 110 to execute a printing operation, the portable terminal 50 can transmit the print data to the MFP 110 through the MFP 10 (i.e., a G/O device) by using the second WFDNW.

As described above, when the PC 120 (i.e., a G/O device) is disconnected from the first WFDNW, the MFP 10 automatically form the second WFDNW to which the respective devices 10, 50, 110 belong. That is, the MFP 10 automatically form the second WFDNW even though the user does not apply the WFD connection operation (refer to FIG. 3) to the respective devices 10, 50, 110.

Figure 6:
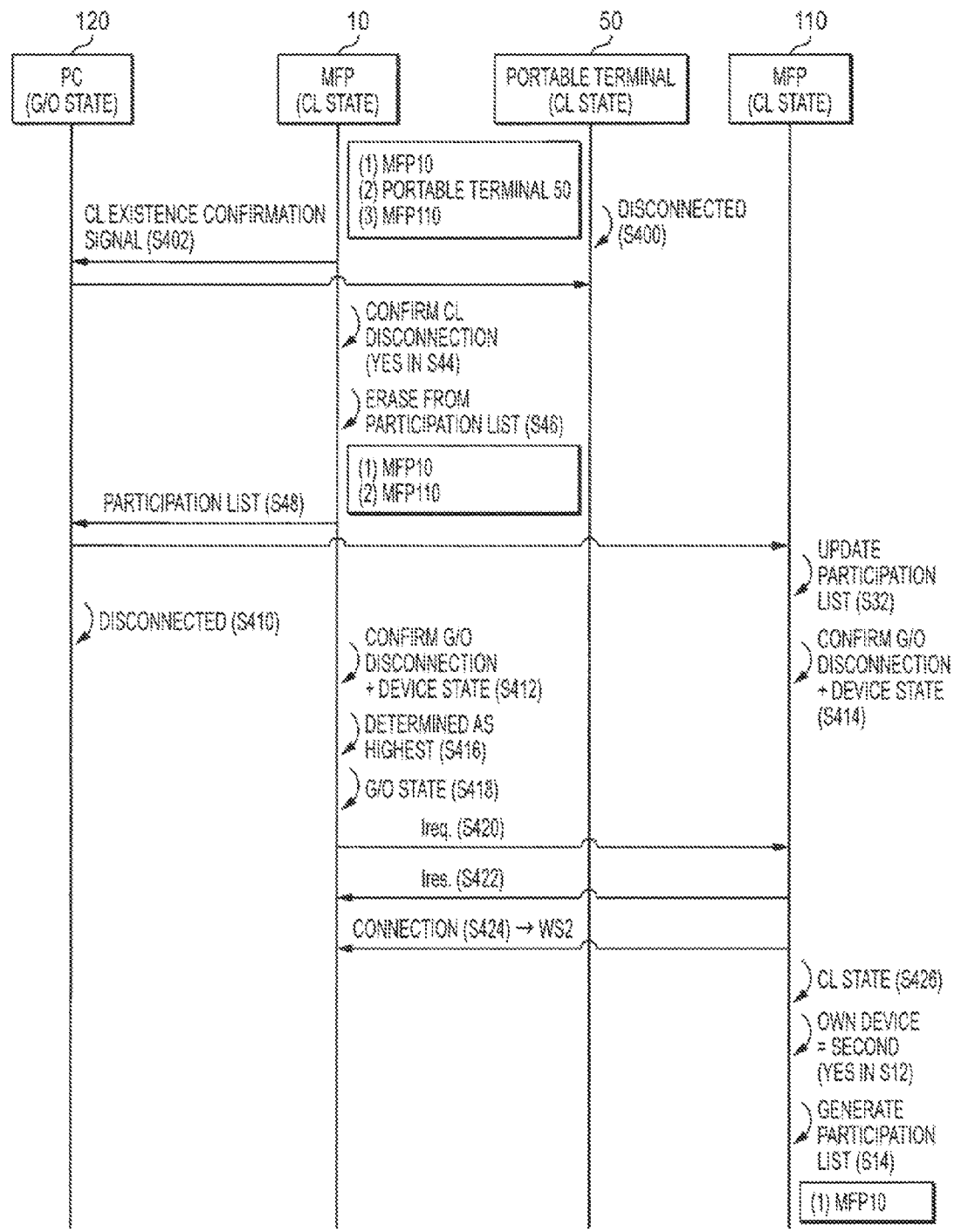
FIG. 6 is a sequence diagram of a case B where a CL device is disconnected.

(Case B; FIG. 6)

An initial state of a case B of FIG. 6 is the same as that of the case A of FIG. 5. In the case B, before the PC 120 (i.e., a G/O device) is disconnected from the first WFDNW, the portable terminal 50 is disconnected from the first WFDNW in S400.

In S402, the control unit 30 of the MFP 10 transmits a CL existence confirmation signal to the portable terminal 50. Since the control unit 30 does not receive a response signal from the portable terminal 50, it determines that the portable terminal 50 is disconnected from the first WFDNW (YES in S44 of FIG. 2). Therefore, the registration unit 43 of the MFP 10 deletes the MAC address of the portable terminal 50 from the participation list to thereby generate an updated participation list (S46). Then, the control unit 30 of the MFP 10 broadcasts the updated participation list to the first WFDNW (S48).

When the MFP 110 receives the participation list from the MFP 10 (S30 in FIG. 2), it stores the received participation list in the memory (not shown) of the MFP 110, instead of the old participation list (S32).

In S410, the PC 120 is disconnected from the first WFDNW. In this case, in S412, the confirmation unit 45 of the MFP 10 confirms that the PC 120 is disconnected from the first WFDNW and shifts the state of the MFP 10 from the CL state to the device state. Also, in S414, the MFP HO confirms that the PC 120 is disconnected from the first WFDNW and shifts the state of the MFP 110 from the CL state to the device state.

The processing of S416 and S418 that are executed thereafter by the MFP 10 is the same as S308 and S310 of FIG. 5. Since the MAC address of the portable terminal 50 is not set in the participation list, the transmission unit 42 of the MFP 10 does not transmit the Ireq signal to the portable terminal 50. Also, the processing of S420 to S426 is the same as S320 to S326 of FIG. 5. As a result, the MFP 110 newly participates in the second WFDNW, as a CL device.

Since the MFP 110 is shifted from the device state to the CL state, the MFP 110 determines YES in S10 of FIG. 2. Also, since the MFP 110 receives the Ireq signal at the second highest level state and is shifted to the CL state, the MFP 110 determines YES in S12. Therefore, the MFP 110 generates a new participation list in which the MAC address for WFD of the MFP 110 is set at the highest level and stores the new participation list in the memory (not shown) of the MFP 110, instead of the old participation list (S14).

As shown in the case B of FIG. 6, the state where the portable terminal 50 is disconnected from the first WFDNW may mean that there is a high possibility that the power supply of the portable terminal 50 is off or the portable terminal 50 is located at a position away from the MFP 10. In this situation, since the MFP 10 cannot enable the portable terminal 50 to belong to the second WFDNW, the MFP 10 does not, transmit the Ireq signal to the portable terminal 50. Therefore, it is possible to reduce processing load of the MFP 10.

Figure 7:
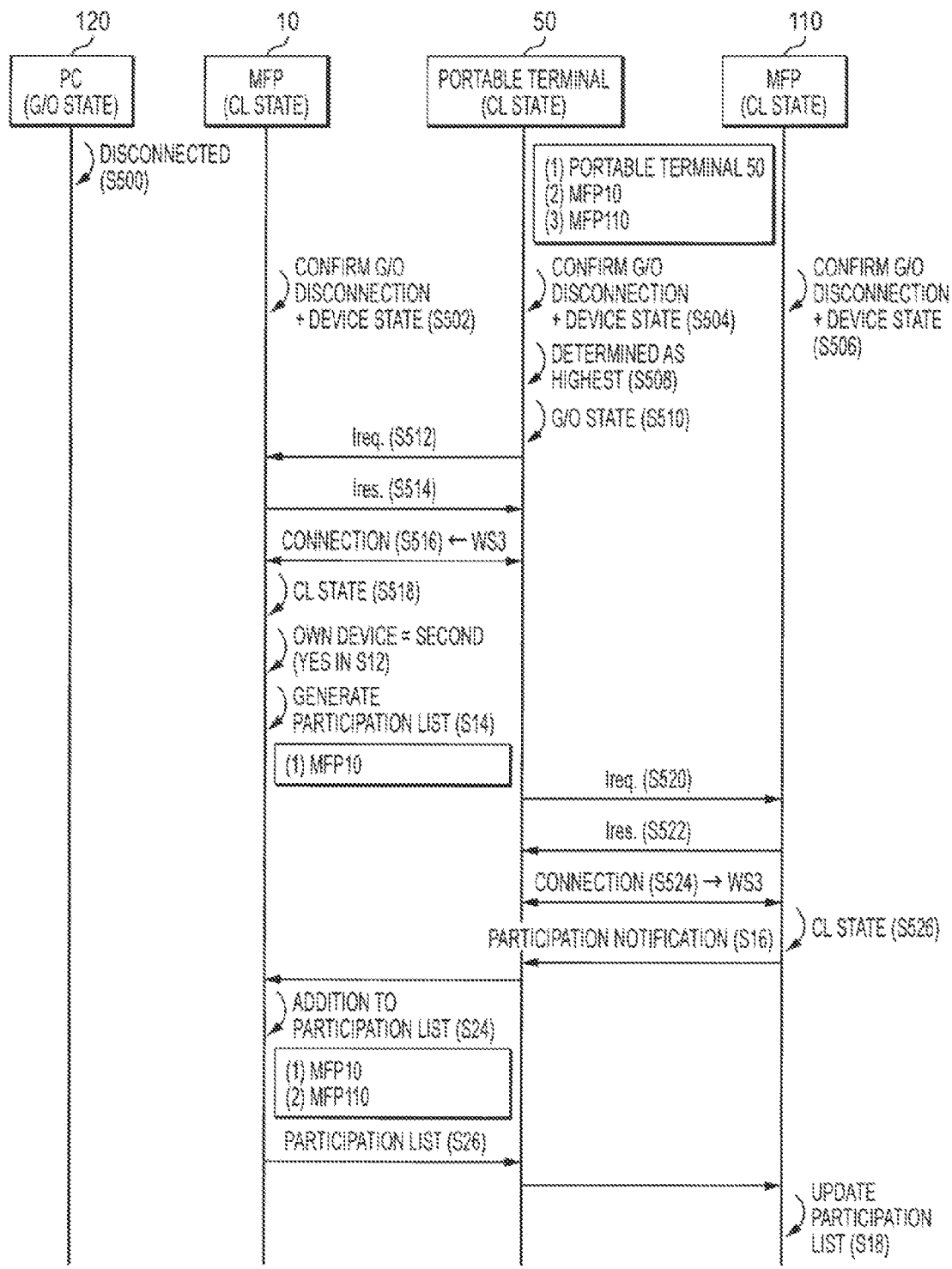
FIG. 7 is a sequence diagram of a case C where a portable terminal is the earliest CL device.

(Case C; FIG. 7)

At an initial state of a case C of FIG. 7, the first WFDNW is established, like the initial state of the case A of FIG. 5. However, the participation list includes the respective MAC addresses of the portable terminal 50 and the MFPs 10, 110 in order from the higher level. That is, the case C is different from the case A, in that the portable terminal 50 is the earliest CL device.

The processing of S500 to S506 is the same as S300 to S306 of FIG. 5. In S508, the control unit 70 of the portable terminal 50 determines that the portable terminal 50 is the earliest CL device. In this case, in S510, the forming unit 86 of the portable terminal 50 shifts the state of the portable terminal 50 from the device state to the G/O state and newly establishes a third WFDNW. The forming unit 86 prepares WFDWSI (hereinafter, referred to as 'WS3') that should be used in the third WFDNW and stores the WS3 in the memory 74.

The processing of S512 to S516 that is executed thereafter by the portable terminal 50 is the same as S312 to S316 of FIG. 5, except that it is executed by a transmission unit 82 and the establishment unit 84 of the portable terminal 50. As a result, in S518, the establishment unit 44 of the MFP 10 newly participates in the third WFDNW. The processing in which the MFP 10 generates a participation list is the same as the processing in which the portable terminal 50 generates the participation list in the case A of FIG. 5.

The processing of S520 to S524 that is executed thereafter by the portable terminal 50 is the same as S320 to S324 of FIG. 5, except that it is executed by the transmission unit 82 and the establishment unit 84 of the portable terminal 50. As a result, in S526, the MFP 110 newly participates in the third WFDNW. The processing in which the MFP 10 generates an updated participation list is the same as the processing in which the portable terminal 50 generates the updated participation list in the case A of FIG. 5.

As shown in the case A of FIG. 5, in the situation where the MFP 10 is the earliest CL device of the first WFDNW, the MFP 10 transmits the Ireq signal to the portable terminal 50 (S312) to thereby establish a state where the MFP 10 and the portable terminal 50 belong to the second WFDNW. Meanwhile, as shown in the case C of FIG. 7, in the situation where the portable terminal 50 is the earliest device level of the first WFDNW, the MFP 10 does not transmit the Ireq signal to the portable terminal 50 but receives the Ireq signal from the portable terminal 50 (S512) to thereby establish a state where the MFP 10 and the portable terminal 50 belong to the third WFDNW. The MFP 10 can establish a state where the MFP 10 and the portable terminal 50 belong to a same WFDNW by executing the appropriate processing, depending on whether the earliest device of the first WFDNW is the MFP 10 or portable terminal 50.

(Correspondence Relation)

The MFP 10, the PC 120 and the portable terminal 50 are examples of the 'communication apparatus', the 'master station device' and the 'first device', respectively. The MFPs 10, 110 and the portable terminal 50 are examples of the 'plurality of slave station devices'. The MAC address for WFD of the MFP 10 and the MAC address of the portable terminal 50 are examples of the 'two or more identification information of two or mo devices'. The Ireq signal, the G/O existence confirmation signal and the WS2 are examples of the 'first type command', the 'predetermined signal' and the 'wireless setting information', respectively.

In the case A of FIG. 5 and the case B of FIG. 6, the first WFDNW and the second WFDNW are examples of the 'first wireless network' and the 'second wireless network', respectively. In the case C of FIG. 7, the first WFDNW and the third WFDNW are examples of the 'first wireless network' and the 'second wireless network', respectively. Also, the situation of the case A of FIG. 5 and the situation of the case C of FIG. 7 are examples of the 'first situation' and the 'second situation', respectively. Meanwhile, in the case C of FIG. 7, it can be said that the portable terminal 50 and the MFP 10 are examples of the communication apparatus' and the 'first device', respectively.

SECOND ILLUSTRATIVE EMBODIMENT

Subsequently, a second illustrative embodiment is set with reference to FIGS. 8 and 9. Also in this illustrative embodiment, the respective processing of FIGS. 2 to 4 is the same as the first illustrative embodiment. In this illustrative embodiment, a G/O Negotiation Request signal (hereinafter, referred to as 'G/ONego signal') is used instead of the Ireq signal. The G/ONego signal is a signal for requesting execution of the G/O negotiation.

(Case D; FIG. 8)

Figure 8:
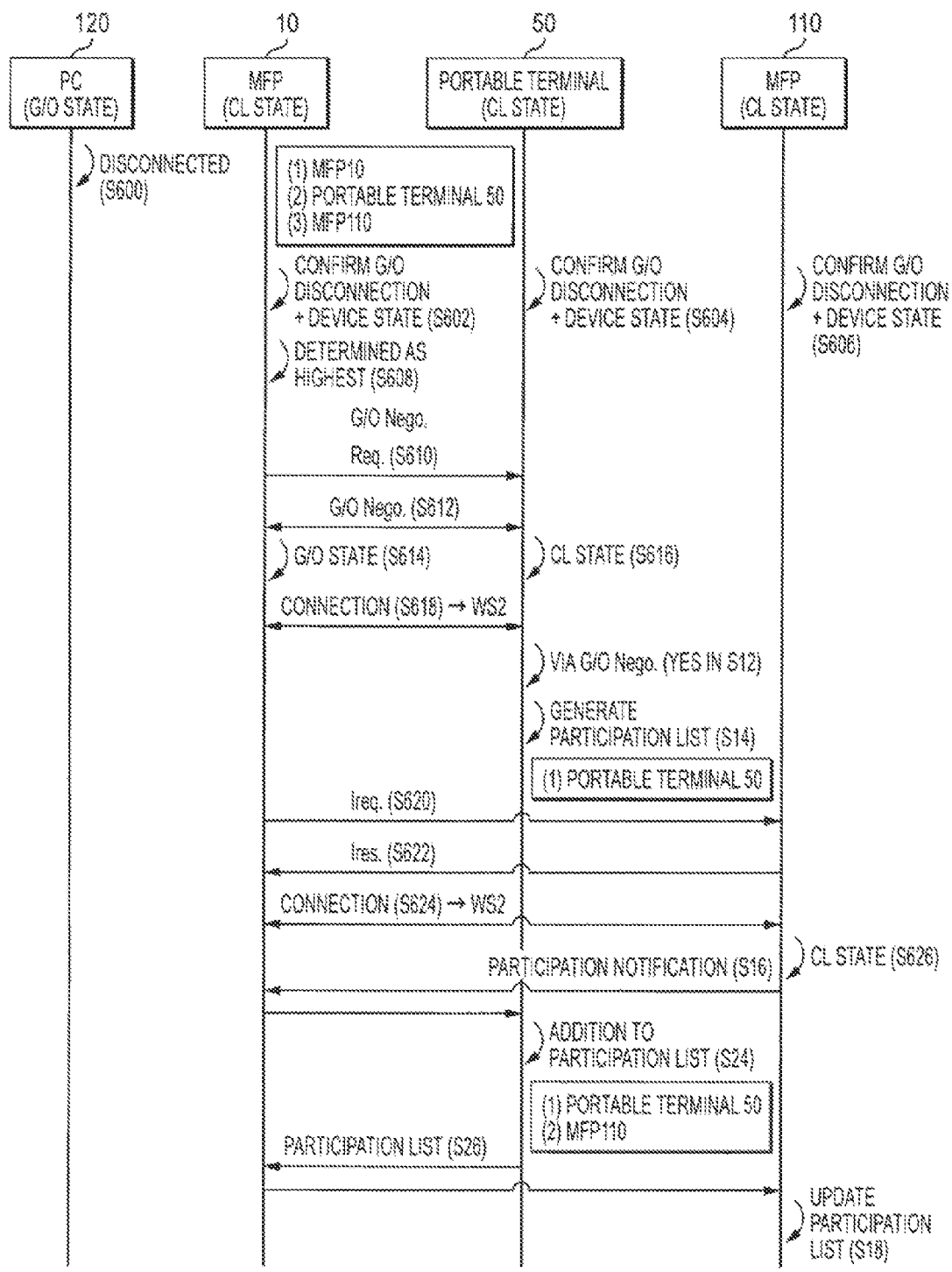
FIG. 8 is a sequence diagram of a case D where the MFP becomes a G/O device in G/O negotiation.

An initial state of a case D of FIG. 8 is the same as that of the case A of FIG. 5. The processing of S600 to S608 is the same as that of S300 to S308 of FIG. 5. In S610, the transmission unit 42 of the MFP 10 transmits a G/ONego signal including the MAC address of the portable terminal 50, which is set at the second highest level of the participation list in the memory 34, as a transmission destination. Thereby, the MFP 10 can request the portable terminal 50 to execute the G/O negotiation.

In S612, the establishment unit 44 of the MFP 10 executes the G/O negotiation with the portable terminal 50. In S614, the establishment unit 44 determines that the MFP 10 becomes at the G/O state as a result of the G/O negotiation, and shifts the state of the MFP 10 from the device state to the G/O state. Also, in S616, the establishment unit 84 of the portable terminal 50 determines that the portable terminal 50 becomes at the CL state as a result of the G/O negotiation, and shifts the state of the portable terminal 50 from the device state to the CL state.

In S618, the establishment unit 44 of the MFP 10 supplies the WFDWSI (i.e., the WS2), which should be used in the second WFDNW, to the portable terminal 50. As a result, connection is established between the MFP 10 and the portable terminal 50. Thereby, the MFP 10 newly establishes a second WFDNW as a G/O device and the portable terminal 50 participates in the second WFDNW as a CL device.

Since the portable terminal 50 executes the G/O negotiation and is thus shifted from the device state to the CL state, the portable terminal 50 is the earliest CL device of the second WFDNW. Therefore, the control unit 70 of the portable terminal 50 generates a participation list in which the MAC address of the portable terminal 50 is set at the highest level (YES in S10 and YES in S12 of FIG. 2, S14).

Then, the transmission unit 42 of the MFP 10 transmits the Ireq signal to each MAC address, which is set at the third highest level or lower of the participation list, as a transmission destination. That is, in S620, the transmission unit 42 transmits the Ireq signal to the MFP 110. The processing of S620 to S626 is the same as that of S320 to S326 of FIG. 5. Also, the respective processing relating to the participation list, which is executed after S626, is the same as that of FIG. 5.

(Case E; FIG. 9)

Figure 9:
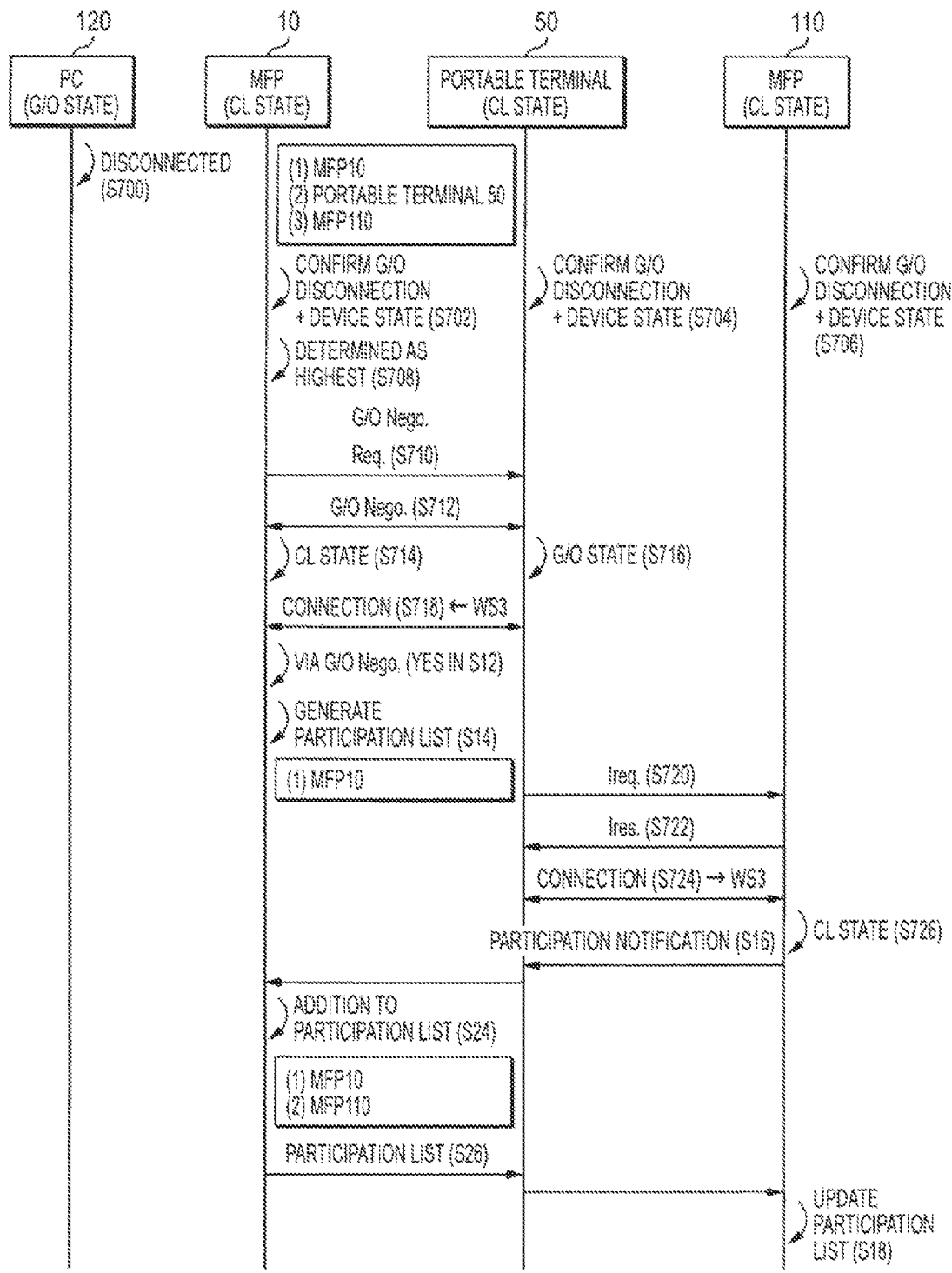
FIG. 9 is a sequence diagram of a case E where the portable terminal becomes a G/O device in G/O negotiation.

A case E of FIG. 9 is different from the case D of FIG. 8, in that a result of the G/O negotiation is different. The processing of S700 to S712 is the same as that of S600 to S612 of FIG. 8. In S714, the establishment unit 44 of the MFP 10 determines that the MFP 10 becomes at the CL state as a result of the G/O negotiation, and shifts the state of the MFP 10 from the device state to the CL state. Also, in S716, the establishment unit 84 of the portable terminal 50 determines that the portable terminal 50 becomes at the G/O state as a result of the G/O negotiation, and shifts the state of the portable terminal 50 from the device state to the G/O state.

In S718, the establishment unit 44 of the portable terminal 50 supplies the WFDWSI (i.e., the WS3), which should be used in the third WFDNW, to the MFP 10. As a result, connection is established between the MFP 10 and the portable terminal 50. Thereby, the portable terminal 50 newly establishes a third WFDNW as a G/O device and the MFP 10 participates in the third WFDNW as a CL device.

The respective processing relating to the participation list, which is executed thereafter, and the processing of S720 to S726 are the same as the case A of FIG. 5 and the case D of FIG. 8, except that the execution subjects of the processing are different.

(Effects of Second Illustrative Embodiment)

As shown in FIGS. 8 and 9, when the PC 120 (i.e., a G/O device) is disconnected from the first WFDNW (S600, S700), the MFP 10 transmits the G/ONego signal to the portable terminal 50 (S610, S710). Therefore, the MFP 10 can determine at which of the G/O state and the CL state the MFP 10 becomes by executing the G/O negotiation with the portable terminal 50 (S612, S712).

When it is determined that the MFP 10 becomes at the G/O state (S614 of FIG. 8), the MFP 10 supplies the WFDWSI (i.e., WS2) of the second WFDNW to the portable terminal 50 (S618) to thereby establish a state where the MFP 10 and the portable terminal 50 belong to the second WFDNW. In the meantime, when it is determined that the MFP 10 becomes at the CL state (S714 in FIG. 9), the MFP 10 acquires the WFDWSI (i.e., the WS3) of the third WFDNW from the portable terminal 50 (S718) to thereby establish a state where the MFP 10 and the portable terminal 50 belong to the third WFDNW. The MFP 10 can establish a state where the MFP 10 and the portable terminal 50 belong to the same WFDNW by executing the appropriate processing in accordance with the result of the G/O negotiation.

Also, in the case D of FIG. 8, the MFP 10 further transmits the Ireq signal and the WS2 to the MFP 110 (S620, S624) to thereby establish a state where the MFPs 10, 110 and the portable terminal 50 belong to the second WFDNW. The MFP 10 can appropriately establish a state where the MFPs 10, 110 and the portable terminal 50 belong to the second WFDNW.

(Correspondence Relation)

In this illustrative embodiment, the MFP 10 and the portable terminal 50 are examples of the 'communication apparatus' and the 'first device', respectively. The G/ONego signal and the Ireq signal are examples of the 'first, type command' and the 'second type command'. In the case D of FIG. 8, the state where the second WFDNW to which only the MFP 10 and the portable terminal 50 belong is established is an example of the 'second state'. Also, in the case D of FIG. 8, the state where the second WFDNW to which the MFPs 10, 110 and the portable terminal 50 belong is established is an example of the 'first state'.

The WS2 of FIG. 8 and the WS3 of FIG. 9 are examples of the 'first wireless setting information' and the 'second wireless setting information', respectively. In the case D of FIG. 8, the first WFDNW and the second WFDNW are examples of the 'first wireless network' and the 'second wireless network', respectively. In the case E of FIG. 9, the first WFDNW and the third WFDNW are examples of the 'first wireless network' and the 'second wireless network', respectively.

THIRD ILLUSTRATIVE EMBODIMENT

Subsequently, a third illustrative embodiment will be described with reference to FIG. 10. In this illustrative embodiment, the earliest CL device does not transmit the Ireq signal but the portable terminal 50 transmits the Ireq signal when there is a printing instruction, which is a trigger. Also, unlike the first and second illustrative embodiments, in this illustrative embodiment, all the CL devices of the first WFDNW do not belong to the second WFDNW but the portable terminal 50 and only the MFP 10 (or MFP 110), which should execute a printing operation, belong to a new WFDNW.

The respective processing of FIGS. 2 to 4 is the same as the first illustrative embodiment. However, in this illustrative embodiment, if the participation list is once generated based on the processing of FIG. 3, even though the printing instruction (which is a trigger) to the portable terminal 50 leads the shift of the portable terminal 50 from the device state to the CL state (i.e., even though the result of the determination in S10 of FIG. 2 is YES), the processing of S12 to S18 is not executed. Also, in this illustrative embodiment, not only the MAC addresses of the devices but also model names and node names of the devices are set in the participation list. That is, in S14 of FIG. 2, the devices (for example, the registration unit 43 of the MFP 10 and the registration unit 83 of the portable terminal 50) associate and describe the MAC addresses, model names and node names of the devices in the participation list. In S16, the devices (for example, the control unit 30 of the MFP 10 and the control unit 70 of the portable terminal 50) broadcast the participation notification including the MAC addresses, model names and node names of the devices. Also, in S24, the devices (for example, the registration unit 43 of the MFP 10 and the registration unit 83 of the portable terminal 50) associate and describe the MAC addresses, model names and node names, which are included in the participation notification, in the participation list.

(Case F; FIG. 10)

Figure 10:
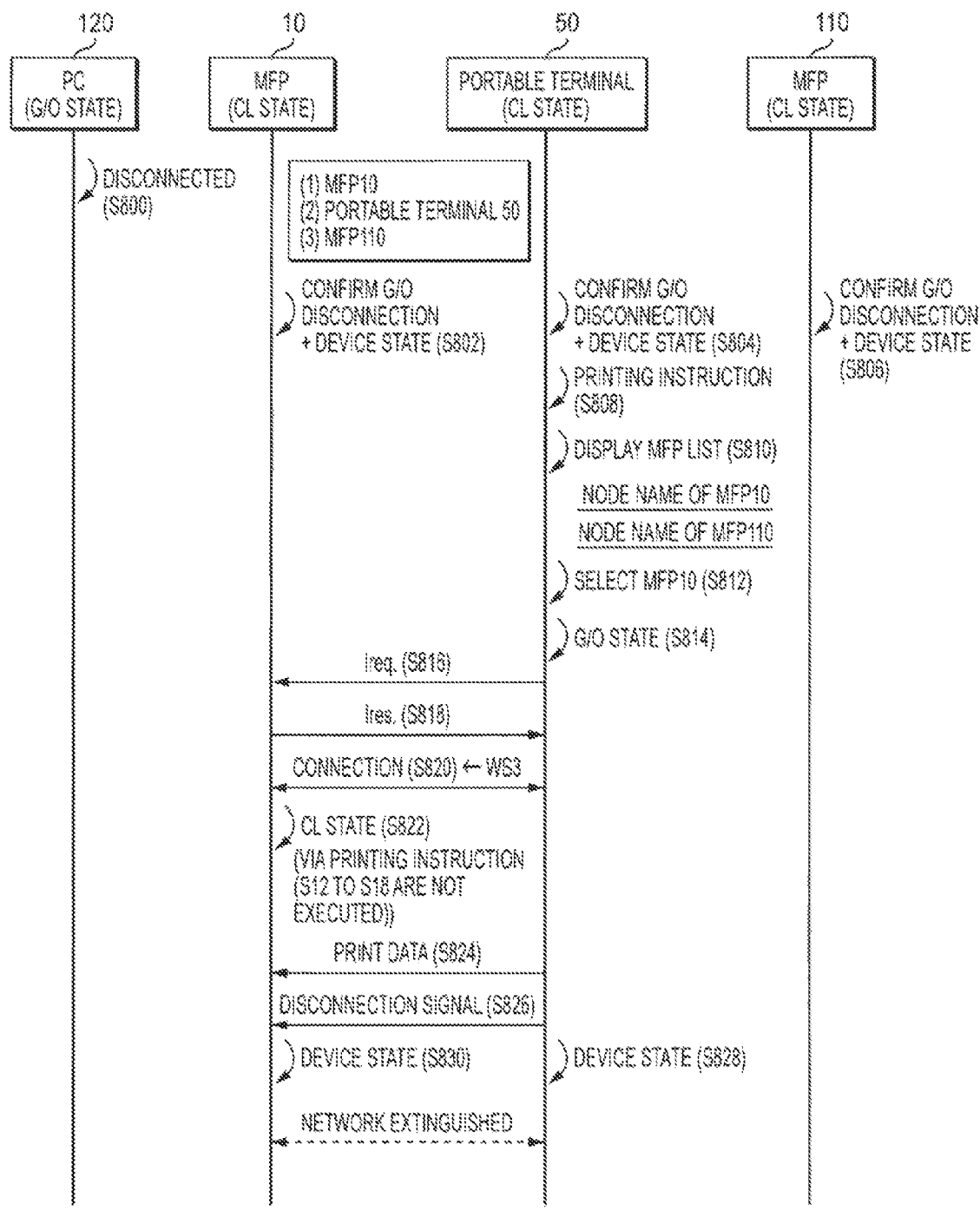
FIG. 10 is a sequence diagram of a case F where a printing instruction is provided.

An initial state of a case F of FIG. 10 is the same as that of the case A of FIG. 5. The processing of S800 to S806 is the same as S300 to S306 of FIG. 5. Although the MFP 10 is the earliest CL device of the first WFDNW, it does not transmit the Ireq signal even when the PC 120 (i.e., a G/O device) is disconnected from the first WFDNW.

In S808, the user starts the application 76 of the portable terminal 50 and then provides a printing instruction to the portable terminal 50 in accordance with a screen displayed by the application 76. The printing instruction includes the user's selection of data (i.e., print data) of a print target stored in the portable terminal 50.

The application 76 of the portable terminal 50 beforehand stores the model names of the MFPs 10, 110 (i.e., model names of various products manufactured by the vendors of the MFPs 10, 110). In S810, a display control unit 89 of the portable terminal 50 extracts the node names associated with the model names of the MFPs 10, 110 from the participation list in the memory 74, thereby extracting respective node names of the MFPs 10, 110. Then, the display control unit 89 generates an MFP list including the respective node names of the MFPs 10, 110 and displays the MFP list on the display unit 54.

In S812, the user applies to the operation unit 52 a selection instruction for selecting the node name of the MFP 10 from the MFP list. In this case, in S814, the forming nit 86 of the portable terminal 50 shifts the state of the portable terminal 50 from the device state to the G/O state without executing the G/O negotiation. Thereby, the forming unit 86 newly establishes a third WFDNW.

Then, in S816, the transmission unit 82 of the portable terminal 50 first extracts the MAC address for WFD of the MFP 10, which is associated with the node name of the MFP 10 selected by the user, from the participation list. Then, the transmission unit 82 transmits an Ireq signal, which includes the MAC address for WFD of the MFP 10 as a transmission destination.

In S818, the establishment unit 84 of the portable terminal 50 receives the Ires signal from the MFP 10. Then, in S820, the establishment unit 84 supplies the WFDWSI (i.e., the WS3) of the third WFDNW to the MFP 10. As a result, connection is established between the MFP 10 and the portable terminal 50.

In S822, the control unit 30 of the MFP 10 shifts the state of the MFP 10 from the device state to the CL state. Thereby, the MFP 10 newly participates in the third WFDNW, as a CL device.

In the meantime, when the connection is established between the MFP 10 and the portable terminal 50, predetermined information is supplied from the portable terminal 50 to the MFP 10. The predetermined information is information indicating that a printing instruction has been provided to the portable terminal 50. Thereby, even when a result of the determination in S10 of FIG. 2 is YES, the control unit 30 of the MFP 10 can know that a printing instruction has been provided to the portable terminal 50. As a result, the MFP 10 does not execute the processing of S12 to S18. Since the MFP 10 does not generate a new participation list, the MFPs 10, 110 and the portable terminal 50 can continue to use the old participation list (i.e., the participation list in which the information about the respective CL devices of the first WFDNW is described).

Then, in S824, a communication execution unit 87 of the portable terminal 50 transmits the print data, which is stored in the portable terminal 50, to the MFP 10 by using the third WFDNW, without through the other apparatus. Thereby, the control unit 30 of the MFP 10 receives the print data from the portable terminal 50 and supplies the print data to the print execution unit 16. As a result, it is possible to provide a printed printing medium to the user.

In S826, when the communication of the print data is over, an extinction unit 88 of the portable terminal 50 transmits a disconnection signal, which indicates that the portable terminal 50 is disconnected from the third WFDNW, to the MFP 10. Then, in S828, the extinction unit 88 shifts the state of the portable terminal 50 from the G/O state to the device state. That is, the extinction unit 88 stores the WFD state value indicating the device state in the memory 74 and deletes the WS3 from the memory 74.

Also, in S830, when the control unit 30 of the MFP 10 receives the disconnection signal from the portable terminal 50, it shifts the state of the MFP 10 from the G/O state to the device state. That is, the control unit 30 stores the WFD state value indicating the device state in the memory 34 and deletes the WS3 from the memory 34. Thereby, the third WFDNW is extinguished. Like this, since the third WFDNW is extinguished, it is possible to reduce processing loads of the MFP 10 and the portable terminal 50, compared to a configuration where the third WFDNW is maintained. For example, the portable terminal 50 may operate as the G/O device, so that it doesn't have to execute the processing of managing the CL device.

(Effects of Third Illustrative Embodiment)

As shown in FIG. 3, the portable terminal 50 receives the participation list including the MAC address for WFD of the MFP 10 through the PC 120 (i.e., a G/O device) and stores the participation list in the memory 74 (S18 in FIG. 2). Then, as shown in FIG. 10, when the PC 120 (i.e., a G/O device) is disconnected from the first WFDNW (S800) and the printing instruction and the selection instruction of the MFP 10 are provided (S808, S812), the portable terminal 50 establishes the third WFDNW to which the portable terminal 50 belongs as a G/O device (S814).

Then, the portable terminal 50 transmits the Ireq signal to the MFP 10 by using the MAC address for WFD of the MFP 10 in the participation list (S816) and also supplies the WS3 to the MFP 10 (S820). Thereby, the portable terminal 50 can appropriately establish the state where the MFP 10 and the portable terminal 50 belong to the third WFDNW. In order to enable the MFP 10 to execute a printing operation, the portable terminal 50 transmits the print data to the MFP 10 by using the third WFDNW, without through the other apparatus (S824). The portable terminal 50 can automatically form the third WFDNW to thereby appropriately transmit the print data to the MFP 10 even though the user does not apply the WFD connection operation (refer to FIG. 3) to the MFP 10 and the portable terminal 50.

(Correspondence Relation)

The portable terminal 50 and the MFP 10 are examples of the 'communication apparatus' and the 'first device', respectively. The Ireq signal and the WS3 are examples of the 'first type command' and the 'wireless setting information', respectively. The first WFDNW and the third WFDNW are examples of the 'first wireless network' and the 'second wireless network', respectively.

FOURTH ILLUSTRATIVE EMBODIMENT

Subsequently, a fourth illustrative embodiment will be described with reference to FIGS. 11 and 12. In this illustrative embodiment, a G/ONego signal is used instead of the Ireq signal. The others are basically the same as the third illustrative embodiment.

(Case G; FIG. 11)

The processing of S900 to S912 is the same as S800 to S812 of FIG. 10. In S914, the transmission unit 82 of the portable terminal 50 transmits a G/ONego signal, which includes the MAC address for WFD of the MFP 10 in the participation list as a transmission destination. Thereby, in S916, the establishment unit 84 of the portable terminal 50 executes the G/O negotiation with the MFP 10.

In S918, the establishment unit 44 of the MFP 10 determines that the MFP 10 becomes at the CL state as a result of the G/O negotiation, and shills the state of the MFP 10 from the device state to the CL state. Also, in S920, the establishment unit 84 of the portable terminal 50 determines that the portable terminal 50 becomes at the G/O state as a result of the G/O negotiation, and shifts the state of the portable terminal 50 from the device state to the G/O state.

Then, in S922, the establishment unit 84 of the portable terminal 50 supplies the MFP 10 with the WDFWSI (i.e., the WS3) of the third WFDNW. As a result, connection is established between the MFP 10 and the portable terminal 50. The respective processing (i.e., S924 to S930) thereafter is the same as S824 to S830 of FIG. 10.

(Case H; FIG. 12)

Figure 11:
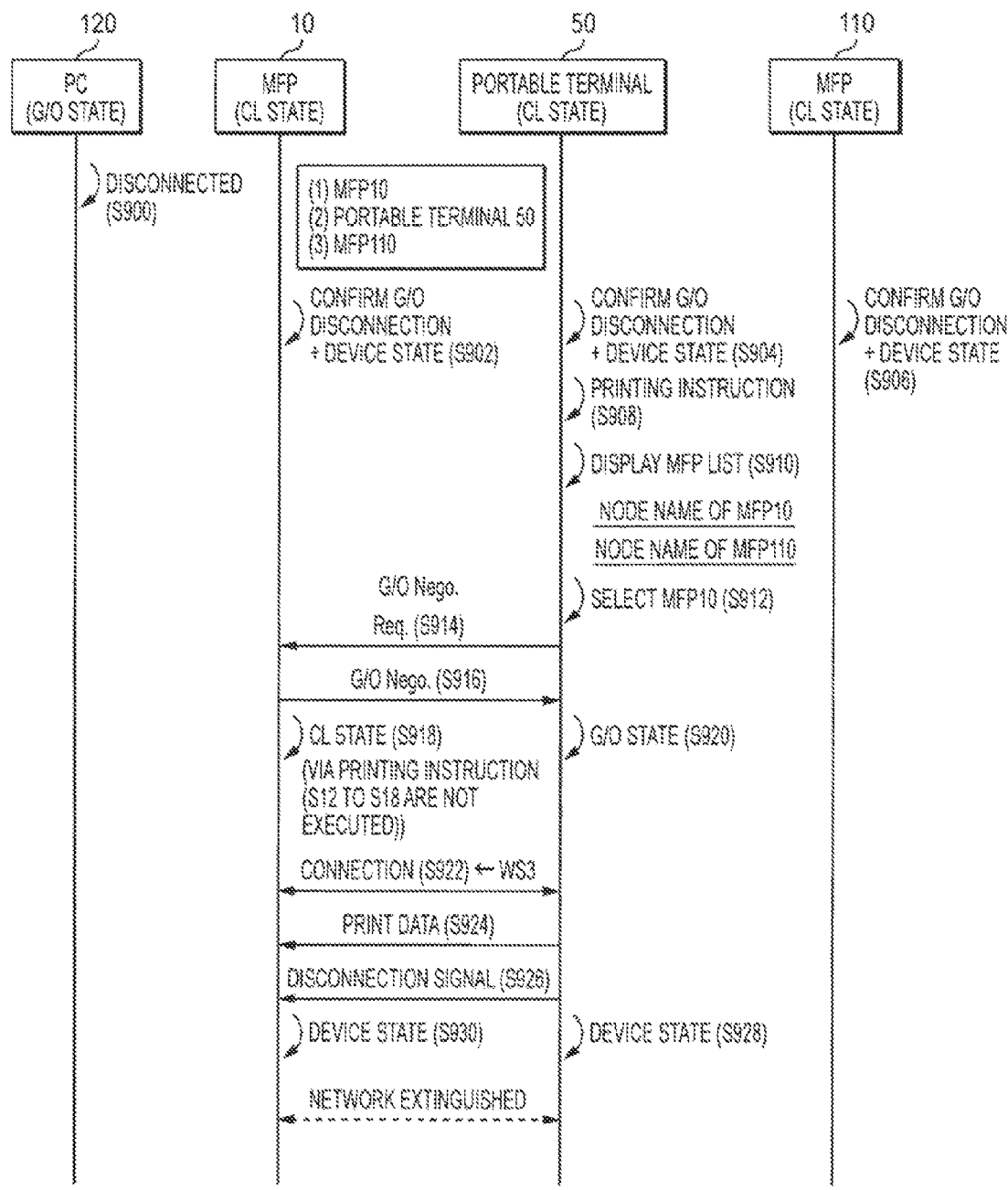
FIG. 11 is a sequence diagram of a case G where the portable terminal becomes a G/O device in G/O negotiation after a printing instruction is provided.
Figure 12:
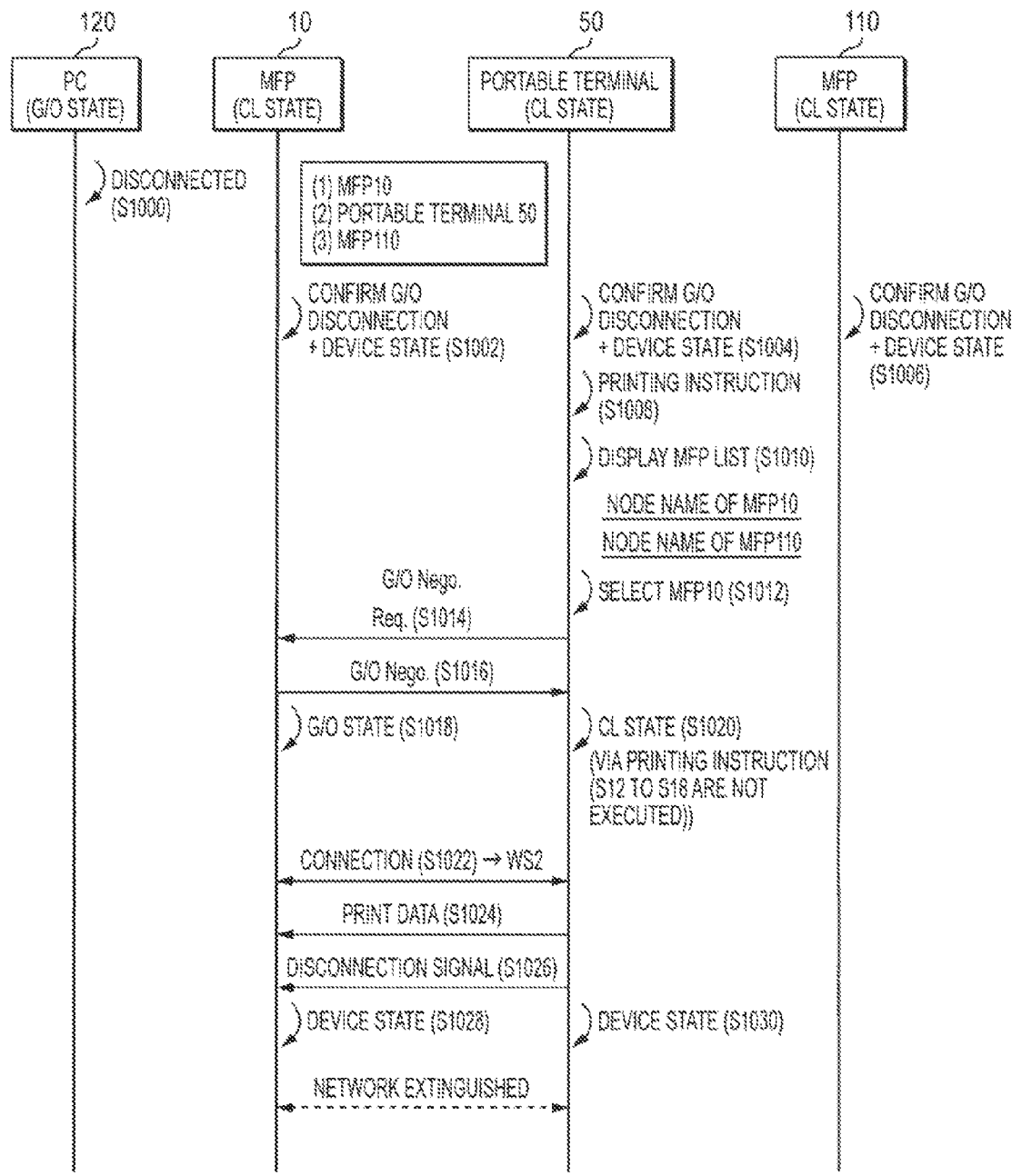
FIG. 12 is a sequence diagram of a case H where the MFP becomes a G/O device in G/O negotiation after a printing instruction is provided.

A case H of FIG. 12 is different from the case G of FIG. 11, in that a result of the G/O negotiation is different. The processing of S1000 to S1016 is the same as that of S900 to S916 of FIG. 11. In S1018, the establishment unit 44 of the MFP 10 determines that the MFP 10 becomes at the G/O state as a result of the G/O negotiation, and shifts the state of the MFP 10 from the device state to the G/O state. Also, in S1020, the establishment unit 84 of the portable terminal 50 determines that the portable terminal 50 becomes at the CL state as a result of the G/O negotiation, and shifts the state of the portable terminal 50 from the device state to the CL state.

Then, in S1022, the establishment unit 44 of the MFP 10 supplies the portable terminal 50 with the WDFWSI (i.e., the WS2) of the second WFDNW. As a result, connection is established between the MFP 10 and the portable terminal 50. The respective processing thereafter (i.e., S1024 to S1030) is the same as that of S924 to S930 in FIG. 11.

(Effects of Fourth Illustrative Embodiment)

As shown in FIGS. 11 and 12, when the PC 120 (i.e., a G/O device) is disconnected from the first WFDNW (S900, S1000), the portable terminal 50 transmits the G/ONego signal to the MFP 10 (S914, S1014). Therefore, the portable terminal 50 executes the G/O negotiation with the MFP 10 (S916, S1016) to thereby determine at which state of the G/O state and the CL state the portable terminal 50 becomes.

When it is determined that the portable terminal 50 becomes at the G/O state (S920 in FIG. 11), the portable terminal 50 supplies the WFDWSI (i.e., the WS3) of the third WFDNW to the MFP 10 (S922), thereby establishing a state where the MFP 10 and the portable terminal 50 belong to the third WFDNW. On the other hand, when it is determined that the portable terminal 50 becomes at the CL state (S1020 in FIG. 12), the portable terminal 50 acquires the WFDWSI (i.e., the WS2) of the second WFDNW from the MFP 10 (S1022), thereby establishing a state where the MFP 10 and the portable terminal 50 belong to the second WFDNW. The portable terminal 50 executes the appropriate processing in accordance with the result of the G/O negotiation, thereby appropriately establishing a state where the MFP 10 and the portable terminal 50 belong to the same WFDNW.

(Correspondence Relation)

In this illustrative embodiment, the portable terminal 50 and the MFP 10 are examples of the 'communication apparatus' and the 'first device', respectively. The G/ONego signal is an example of the 'first type command'. The WS3 of FIG. 11 and the WS2 of FIG. 12 are examples of the 'first wireless setting information' and the 'second wireless setting information', respectively. In the case G of FIG. 11, the first WFDNW and the third WFDNW are examples of the 'first wireless network' and the 'second wireless network', respectively. Also, in the case H of FIG. 12, the first WFDNW and the second WFDNW are examples of the 'first wireless network' and the 'second wireless network', respectively.

Although the specific illustrative embodiments of the invention have been specifically described, they are just exemplary and do not limit the claims. The technology defined in the claims includes a variety of modifications and changes to the above illustrative embodiments. In the following, modified embodiments of the above illustrative embodiments are enumerated.

MODIFIED EMBODIMENT 1

For example, in the case A of FIG. 5, when an operation for turning off the power supply of the PC 120 is applied, the PC 120 (i.e., a G/O device) may transmit a disconnection signal, which indicates that the PC 120 is disconnected from the first WFDNW, to the respective devices 10, 50, 110. In this case, when the respective devices 10, 50, 110 receive the disconnection signal from the PC 120, the respective devices may be shifted to the device state (S302 to S306). That is, the respective devices 10, 50, 110 can know that the PC 120 is disconnected from the first WFDNW, even though the G/O existence confirmation signal (refer to FIG. 4) is not transmitted. Therefore, the confirmation units 45, 85 of the MFP 10 and the portable terminal 50 may be omitted.

MODIFIED EMBODIMENT 2

In the case A of FIG. 5, when the participation list includes only the MAC address for WFD of the MFP 10 and the MAC address of the portable terminal 50 (i.e., when the participation list includes only two MAC addresses), the transmission unit 42 of the MFP 10 may transmit the Ireq signal to only the portable terminal 50 without transmitting the Ireq signal to the MFP 110. In this case, the establishment unit 44 of the MFP 10 may establish a state where only the MIT 10 and portable terminal 50 belong to the second WFDNW. Also, in another modified embodiment, in the case A of FIG. 5, when the participation list includes another MAC address (i.e., when the participation list includes four or more MAC addresses), the transmission unit 42 of the MFP 10 may transmit the Ireq signal to each of three or more devices including the respective devices 50, 110. In this case, the establishment unit 44 of the MFP 10 may establish a state where four or more devices including the respective devices 10, 50, 110 belong to the second WFDNW. Generally speaking, the 'plurality of slave station devices' may be two or more slave station devices.

MODIFIED EMBODIMENT 3

For example, in the case A of FIG. 5, the MFP 10 that is the earliest CL device (i.e., the device at the highest level in the participation list) of the first WFDNW transmits the Ireq signal. Instead of this, a device at the second highest level in the participation list (for example, the portable terminal 50 in the case A of FIG. 5) may transmit the Ireq signal. Also, for example, a device, which is preselected from the participation list by a user, may transmit the Ireq signal.

MODIFIED EMBODIMENT 4

In the cases F to H of FIGS. 10 to 12, the display control unit 89 displays the MFP list including the node names of all the MFPs in the participation list. Instead of this, the display control unit 89 may display an MFP list including only a node name of the MFP, which is a transmission destination to which the portable terminal 50 has transmitted the print data, of the node names of all the MFPs in the participation list. Also, the display control unit 89 may display an MFP list including only a node name, which is selected in advance by a user, of the node names of all the MFPs in the participation list.

MODIFIED EMBODIMENT 5

In the above illustrative embodiments, the example here the print data is transmitted from the portable terminal 50 to the MFP 10 has been described. However, the technology of the illustrative embodiments can be also applied to communication of data different from the print data. For example, scan data may be transmitted from the MFP 10 to the portable terminal 50. Also, the technology of the above illustrative embodiments can be also applied to communication of data (for example, voice data, moving picture data and the like) different from the print data and the scan data.

MODIFIED EMBODIMENT 6

The method with which the CL device (for example, the MFP 10) acquires the MAC address of the other CL device (for example, the portable terminal 50) is not limited to the method of executing the participation list managing processing of FIG. 2. For example, when the WFDNW to which the portable terminal 50 and the MFPs 10, 110 belong as the CL devices is established, the control unit 30 of the MFP 10 may broadcast a request packet of the MAC address to the WFDNW at predetermined timing (for example, periodically). In this case, when the portable terminal 50 receives the request packet, the portable terminal 50 transmits a response packet, which includes the MAC address of the portable terminal 50, to the MFP 10. Thereby, the reception unit 41 can receive the MAC address from the portable terminal 50 through the G/O device. Likewise, the reception unit 41 can receive the MAC address from the MFP 110. Also, the control unit 70 of the portable terminal 50 may broadcast a request packet of the MAC address to the WFDNW at predetermined timing (for example, periodically). In this case, the reception unit 81 can receive the MFDMAC of the respective MFPs 10, 110 from the respective MFPs 10, 110 through the G/O device.

MODIFIED EMBODIMENT 7

The 'master station' is not limited to the G/O device of the WFD and may be any device insomuch as it is a device (for example, a device capable of relating wireless communication between respective devices belonging to a wireless network) managing the respective devices belonging to the wireless network. Also, the 'slave station' is not limited to the CL device of the WFD and may be any device insomuch as it is a device that is managed from the master station in the wireless network.

MODIFIED EMBODIMENT 8

The 'communication apparatus' and the 'slave station device (first device) are not limited to the MFP 10 and the portable terminal 50 and may be other communication apparatus (for example, a printer, a scanner, a FAX apparatus, a copier, a phone, a desktop PC, a server and the like). Also, the 'master station device' is not limited to the PC 120 and may be other communication apparatus (for example, an MFP, a printer, a scanner, a FAX apparatus, a copier, a portable terminal and the like).

MODIFIED EMBODIMENT 9

In the above illustrative embodiments, the CPU 32 of the MFP 10 executes the programs (i.e., software) in the memory 34, thereby implementing the respective units 41 to 46. Instead of this, at least one of the respective units 41 to 46 may be implemented by hardware such as a logical circuit and the like. Likewise, at least one of the respective units 81 to 89 may be implemented by hardware such as a logical circuit and the like.

Also, the technical elements illustrated in the specification or drawings exhibit the technical availability individually or by a variety of combinations thereof and are not limited to the combinations defined in the claims at the time of filing the application. Also, the technology exemplified in the specification or drawings achieves a plurality of purposes at the same time and the achievement of any one purpose has the technical availability.

What is claimed is:

1. A communication apparatus comprising:
a processor; and
memory storing instructions that, when executed by the processor, cause the processor to execute:
receiving identification information of a first device from the first device through a master station device, at a state where a first wireless network has been established to which a master station device and a plurality of slave station devices belong, wherein the first device is one of the plurality of slave station devices;
registering the identification information of the first device with the memory of the communication apparatus;
transmitting a first type command to the first device by using the identification information of the first device registered in the memory, in a specific case where the master station device is disconnected from the first wireless network, wherein the first type command is a command for establishing a state where a transmission source device, from which the first type command is transmitted, and a transmission destination device, to which the first type command is transmitted, belong to a same wireless network; and
establishing a first state, when the first type command is transmitted to the first device, wherein the first state is a state where the communication apparatus and the first device belong to a second wireless network different from the first wireless network.

2. The communication apparatus according to claim 1,
wherein instructions further cause the processor to execute confirming whether the master station device is disconnected from the first wireless network by transmitting a predetermined signal to the master station device to determine whether a response signal is received from the master station device, and
wherein in the specific case where it is confirmed that the master station device is disconnected from the first wireless network, instructions further cause the processor to execute transmitting the first type command to the first device.

3. The communication apparatus according to claim 1,
wherein the first type command is a command for requesting that a transmission destination device, to which the first type command is transmitted, newly belongs to a wireless network, as a slave station, to which a transmission source device, from which the first type command is transmitted, already belongs as a master station,
wherein instructions further cause the processor to execute newly establishing, in the specific case, the second wireless network to which the communication apparatus belongs as a master station,
wherein in the specific case, instructions further cause the processor to execute transmitting the first type command to the first device after the second wireless network is newly established, and
wherein instructions further cause the processor to execute establishing the first state by supplying the first device with wireless setting information, which is used in the second wireless network.

4. The communication apparatus according to claim 3,
wherein instructions further cause the processor to execute receiving two or more identification information of two or more devices, which comprises the first device, of the plurality of slave station devices belonging to the first wireless network from the two or more devices through the master station device,
wherein instructions further cause the processor to execute registering the two or more identification information with the memory,
wherein in the specific case, instructions further cause the processor to execute transmitting the first type command to each of the two or more devices by using each of the two or more identification information, and
wherein when the first type command is transmitted to each of the two or more devices, instructions further cause the processor to execute establishing the first state by supplying the wireless setting information to the devices, wherein the first state is a state where the communication apparatus and the two or more device belong to the second wireless network.

5. The communication apparatus according to claim 1,
wherein the first type command is a command for requesting execution of negotiation communication for determining that each of a transmission source device and a transmission destination device, to which the first type command is transmitted, becomes one of a master station and a slave station of a not-established wireless network, and
wherein when the first type command is transmitted to the first device, instructions further cause the processor to execute performing the negotiation communication with the first device to determine that the communication apparatus becomes one of a master station and a slave station of the second wireless network,
wherein when it is determined as a result of the negotiation communication that the communication apparatus becomes the master station of the second wireless network, instructions further cause the processor to execute supplying the first device with first wireless setting information that is used in the second wireless network, thereby establishing the first state, and
wherein, when it is determined as a result of the negotiation communication that the communication apparatus becomes the slave station of the second wireless network, instructions further cause the processor to execute acquiring second wireless setting information, which is used in the second wireless network, from the first device, thereby establishing the first state.

6. The communication apparatus according to claim 5, wherein instructions further cause the processor to execute receiving two or more identification information of two or more devices, which comprises the first device, of the plurality of slave station devices belonging to the first wireless network from the two or more devices through the master station device, wherein instructions further cause the processor to execute registering the two or more identification information with the memory, wherein in the specific case, instructions further cause the processor to execute transmitting the first type command to only the first device of the two or more devices, wherein when it is determined as a result of the negotiation communication that the communication apparatus becomes the master station of the second wireless network instructions further cause the processor to execute:

supplying the first wireless setting information to the first device to thereby establish a second state where the communication apparatus and only the first device belong to the second wireless network;

transmitting a second type command to each of one or more devices by using identification information of the one or more devices, which is different from the identification information of the first device, of the two or more identification information in the memory, after the second state is established; and when the second type command is transmitted to the one or more devices, instructions further cause the processor to execute, for the one or more devices, supplying the first wireless setting information to the devices to thereby establish the first state where the communication apparatus and the two or more device belong to the second wireless network, wherein the second type command is a command for requesting a transmission destination device of the second type command to newly belong to a wireless network as a slave station, to which a transmission source device of the second type command already belongs as a master station.

7. The communication apparatus according to claim 1, wherein in a first situation where a slave station device, which belongs to the first wireless network, of the plurality of slave station devices is the communication apparatus, instructions further cause the processor to execute transmitting the first type command to the first device in the specific case, wherein in a second situation where a slave station device, which belongs to the first wireless network, of the plurality of slave station devices is the first device, instructions further cause the processor to not execute transmitting the first type command to the first device in the specific case, wherein in the first situation, instructions further cause the processor to execute establishing the first state when the first type command is transmitted to the first device, and wherein in the second situation, instructions further cause the processor to execute establishing the first state when the first type command is received from the first device.

8. The communication apparatus according to claim 1, wherein when the first device is disconnected from the first wireless network before the master station device is disconnected from the first wireless network, instructions further cause the processor to execute deleting the identification information of the first device from the memory and instructions further cause the processor to not execute transmitting the first type command to the first device in the specific case.

9. A non-transitory computer-readable storage medium storing instructions that, when executed by a processor, cause a communication apparatus to perform operations comprising:

receiving, identification information of a first device from the first device through a master station device, at a state where a first wireless network has been established to which the master station device and a plurality of slave station devices belong, wherein the first device is one of the plurality of slave station devices;

registering the identification information of the first device with a memory of the communication apparatus;

transmitting a first type command to the first device by using the identification information of the first device registered in the memory, in a specific case where the master station device is disconnected from the first wireless network, wherein the first type command is a command for establishing a state where a transmission source device, from which the first type command is transmitted, and a transmission destination device, to which the first type command is transmitted, belong to a same wireless network; and establishing a first state, when the first type command is transmitted to the first device, wherein the first state is a state where the communication apparatus and the first device belong to a second wireless network different from the first wireless network.

* * * * *